United States Patent
Kubo et al.

(10) Patent No.: US 10,372,005 B2
(45) Date of Patent: Aug. 6, 2019

(54) ORGANIC ELECTROCHROMIC DEVICE, OPTICAL FILTER, LENS UNIT, AND IMAGING APPARATUS

(71) Applicant: CANON KABUSHIKI KAISHA, Tokyo (JP)

(72) Inventors: Wataru Kubo, Inagi (JP); Shinjiro Okada, Kamakura (JP); Kenji Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/519,636

(22) PCT Filed: Nov. 4, 2015

(86) PCT No.: PCT/JP2015/081670
§ 371 (c)(1),
(2) Date: Apr. 17, 2017

(87) PCT Pub. No.: WO2016/072526
PCT Pub. Date: May 12, 2016

(65) Prior Publication Data
US 2017/0242314 A1    Aug. 24, 2017

(30) Foreign Application Priority Data

Nov. 6, 2014  (JP) .................. 2014-225714
Nov. 6, 2014  (JP) .................. 2014-225715

(51) Int. Cl.
*C09K 9/02*    (2006.01)
*E06B 3/67*    (2006.01)
(Continued)

(52) U.S. Cl.
CPC .......... *G02F 1/1503* (2019.01); *E06B 3/6722* (2013.01); *G02F 1/163* (2013.01);
(Continued)

(58) Field of Classification Search
CPC ........ G02F 1/15; G02F 1/1521; G02F 1/1525; G02F 1/155; G02F 1/163; G02F 1/167;
(Continued)

(56) References Cited

U.S. PATENT DOCUMENTS 3,453,038 A * 7/1969 Erik .................. B41M 5/20
                                                       359/275
4,205,903 A    6/1980 Hamada et al.
(Continued)

FOREIGN PATENT DOCUMENTS

JP   52/057796 A    5/1977
JP   2005-338356 A  12/2005
(Continued)

OTHER PUBLICATIONS

Yamamoto et al., U.S. Appl. No. 15/543,734, filed Jul. 14, 2017.

*Primary Examiner* — Loha Ben
(74) *Attorney, Agent, or Firm* — Venable LLP

(57) ABSTRACT

Provided is an organic electrochromic device which has a high response speed and is excellent in durability even when a large current is flowed transiently, in which: an electrochromic layer arranged between a pair of electrodes contains an organic electrochromic material, a redox substance, and a solvent; the organic electrochromic material and the redox substance are each a material to be reversibly subjected to a redox reaction; and a potential at which the redox substance is oxidized (or reduced) is present between a potential at which the organic electrochromic material is reversibly oxidized (or reduced) and a potential at which the organic electrochromic material is irreversibly oxidized (or reduced).

22 Claims, 8 Drawing Sheets

(51) Int. Cl.
*G02F 1/15* (2019.01)
*G09G 3/34* (2006.01)
*G09G 3/38* (2006.01)
*G02F 1/163* (2006.01)
*G02F 1/1503* (2019.01)
*E06B 9/24* (2006.01)

(52) U.S. Cl.
CPC ................ *G09G 3/34* (2013.01); *G09G 3/38* (2013.01); *C09K 9/02* (2013.01); *E06B 2009/2464* (2013.01); *G02F 1/15* (2013.01)

(58) Field of Classification Search
CPC ..... G02F 2001/1502; G02F 2001/1512; G02F 2001/1515; G02F 2201/44; G02F 2202/22; G02F 1/1503; E06B 3/6722; E06B 2009/2464; E06B 9/24; C09K 9/02; G09G 3/34; G09G 3/3406; G09G 3/38; G02B 27/0172; G02B 27/0176; G02B 6/005
USPC ............. 359/265–275; 345/49, 105; 438/238
See application file for complete search history.

(56) References Cited

U.S. PATENT DOCUMENTS

| | | | | |
|---|---|---|---|---|
| 6,020,987 A * | 2/2000 | Baumann | ......... | B32B 17/10036 359/273 |
| 6,067,184 A * | 5/2000 | Bonhote | ................ | B82Y 20/00 359/265 |
| 6,178,034 B1 * | 1/2001 | Allemand | ............. | G02F 1/1521 359/265 |
| 6,426,827 B1 * | 7/2002 | Bonhote | ................ | B82Y 20/00 252/586 |
| 6,734,305 B2 * | 5/2004 | Pierre | .................... | B82Y 20/00 252/586 |
| 6,879,424 B2 * | 4/2005 | Vincent | .................... | C09K 9/02 252/586 |
| 7,471,437 B2 * | 12/2008 | Lenhard | ................... | C09K 9/02 359/265 |
| 7,995,262 B2 * | 8/2011 | Higuchi | ................... | G02F 1/1521 359/265 |
| 9,030,724 B2 * | 5/2015 | Agrawal | ............... | G02F 1/1506 359/268 |
| 9,145,382 B2 | 9/2015 | Yamada et al. | | |
| 9,304,368 B2 * | 4/2016 | Yashiro | ................. | G02F 1/1525 |
| 9,581,877 B2 * | 2/2017 | Bass | ....................... | G02F 1/155 |
| 2015/0303390 A1 * | 10/2015 | Van Der Boom | ........................ | H01L 51/0098 428/426 |
| 2016/0041447 A1 | 2/2016 | Yamamoto et al. | | |
| 2016/0357082 A1 | 12/2016 | Kubo et al. | | |
| 2017/0003562 A1 | 1/2017 | Kubo et al. | | |
| 2017/0003563 A1 | 1/2017 | Kubo et al. | | |
| 2017/0235202 A1 * | 8/2017 | Kubo | ....................... | G02F 1/155 359/266 |

FOREIGN PATENT DOCUMENTS

| | | |
|---|---|---|
| WO | 98/44384 A1 | 10/1998 |
| WO | 00/66679 A2 | 11/2000 |
| WO | 01/13169 A1 | 2/2001 |
| WO | 2016/167163 A1 | 10/2016 |

* cited by examiner

ORGANIC ELECTROCHROMIC DEVICE, OPTICAL FILTER, LENS UNIT, AND IMAGING APPARATUS

TECHNICAL FIELD

The present invention relates to an organic electrochromic device, and an optical filter, a lens unit, and an imaging apparatus each using the organic electrochromic device.

BACKGROUND ART

An electrochromic ("electrochromic" is hereinafter sometimes abbreviated as "EC") material is widely known as a substance which undergoes changes in optical absorption properties (absorption wavelength and absorbance) through an electrochemical redox reaction. An electrochromic device (EC device), which utilizes the EC material, is applied to a display apparatus, a variable reflectance mirror, a variable transmission window, and the like.

As the EC material, there are widely known both an inorganic EC material and an organic EC material. Of those, an organic EC material, in particular, a low-molecular-weight organic EC material has the following feature: transparency in its uncolored state and a high absorbance in its colored state can both be achieved and appropriate molecular design can be performed through estimation of an absorption wavelength of the colored state. Meanwhile, in an electrochemical reaction, such high energy as to cause decomposition of a molecule itself of an organic compound is applied to the organic EC material in some cases. Accordingly, deterioration of the organic compound itself caused by an electrochemical redox reaction of the compound is often perceived as a problem in putting an EC device using the organic EC material into practical use. In view of this, many attempts have been made to improve durability of the material itself by solving the problem.

In PTL 1, there is disclosed an organic EC device having its durability improved by using an organic low-molecular-weight compound as an EC molecule and adjusting a concentration balance of the compound.

Hitherto, there has also been known an organic EC device containing, in addition to the EC material included in the organic EC device, a substance which undergoes a redox reaction under a certain potential condition.

In PTL 2, there is disclosed an organic EC device containing: an anodic electroactive material; a cathodic electroactive material; an additive which is more easily reduced than the cathodic electroactive material; and an additive which is more easily oxidized than the anodic electroactive material.

In addition, in PTL 3, there is disclosed an organic EC device containing three or more kinds of electroactive materials. Therein, at least two kinds of materials out of the electroactive materials of the organic EC device of PTL 3 are EC materials, and by virtue of these electroactive materials, a pre-selected perceived color can be maintained throughout a normal range of voltages of the organic EC device. In addition, in PTL 3, the perceived color utilizes a staging phenomenon in which the most easily oxidized electroactive material dominates a tint of the perceived color, and when oxidation (reduction) potentials of the electroactive materials are uniformized, their redox reactions are allowed to progress in the same potential region. In addition, the organic EC device of PTL 3 can produce the pre-selected perceived color through the uniformization of the oxidation (reduction) potentials of the electroactive materials.

However, the organic EC device of PTL 1, though exhibiting an improving effect on durability when subjected to a low-speed potential scan operation, has low durability when a large current is flowed transiently in order to obtain a high response speed.

The additives contained in the organic EC device of PTL 2 are added in order to prevent a residual color of the cathodic electroactive material or the anodic electroactive material, but when the additives are EC materials, reactions of the additives cause different coloration. In addition, the additives to be introduced into the organic EC device of PTL 2 are compounds which are more easily reduced or oxidized in terms of potential than the anodic electroactive material or the cathodic electroactive material. Accordingly, when the additives are added in more than necessary amounts, a charge amount required for initiation of coloring/bleaching of the organic EC device is consequently increased, which may cause an increase in power consumption in driving the device or a decrease in response speed.

Further, in the organic EC device of PTL 3, the materials to be used have almost the same redox potential, and hence during oxidation or reduction of a predetermined material, any other material is also oxidized or reduced competitively, resulting in a problem in that power to be consumed in the oxidation or reduction reaction is increased.

CITATION LIST

Patent Literature

PTL 1: International Publication No. WO 00/66679 A2
PTL 2: International Publication No. WO 01/13169 A1
PTL 3: International Publication No. WO 98/44384 A1

SUMMARY OF INVENTION

Technical Problem

The present invention has been made in order to solve the problems described above, and an object of the present invention is to provide an organic electrochromic device which has a high response speed and is excellent in durability even when a large current is flowed transiently.

Solution to Problem

According to a first embodiment of the present invention, there is provided an organic electrochromic device, including:
a pair of electrodes; and
an electrochromic layer arranged between the pair of electrodes,
in which:
the electrochromic layer contains an organic electrochromic material, a redox substance, and a solvent;
the organic electrochromic material and the redox substance each include a material to be reversibly subjected to a redox reaction; and
a potential at which the redox substance is oxidized is present between a potential at which the organic electrochromic material is reversibly oxidized and a potential at which the organic electrochromic material is irreversibly oxidized, or a potential at which the redox substance is reduced is present between a potential at which the organic electrochromic material is reversibly reduced and a potential at which the organic electrochromic material is irreversibly reduced.

Further features of the present invention will become apparent from the following description of exemplary embodiments with reference to the attached drawings.

DESCRIPTION OF EMBODIMENTS

Preferred embodiments of the present invention will now be described in detail in accordance with the accompanying drawings.

An organic electrochromic device (organic EC device) of the present invention is a device including: a pair of electrodes; and an electrochromic layer arranged between the pair of electrodes. In the organic EC device of the present invention, the electrochromic layer contains an organic electrochromic material, a redox substance, and a solvent. In the present invention, the organic electrochromic material and the redox substance each include a material to be reversibly subjected to a redox reaction.

In the present invention, a potential at which the redox substance is oxidized is present between a potential at which the organic electrochromic material is reversibly oxidized and a potential at which the organic electrochromic material is irreversibly oxidized. In addition, in the present invention, a potential at which the redox substance is reduced is present between a potential at which the organic electrochromic material is reversibly reduced and a potential at which the organic electrochromic material is irreversibly reduced.

In addition, in the present invention, when the organic electrochromic material has a first oxidation potential and a second oxidation potential, the redox substance has an oxidation potential which is present between the first oxidation potential and the second oxidation potential. On the other hand, when the organic electrochromic material has a first reduction potential and a second reduction potential, the redox substance has a reduction potential which is present between the first reduction potential and the second reduction potential.

A voltage at which the electrochromic device is driven is preferably applied within the range between the potential at which the redox substance is oxidized and the potential at which the redox substance is reduced.

The redox substance may be an electrochromic material having electrochromicity.

By virtue of the presence of the redox substance, even when a voltage higher than a voltage at which the electrochromic device is generally driven is applied, irreversible oxidation or irreversible reduction of the electrochromic material can be suppressed.

Embodiments of the present invention are described in detail below with reference to the drawings. However, the present invention is not limited to the embodiments described below. It should be noted that in the following description, the organic electrochromic device is sometimes referred to as "organic EC device" and the organic electrochromic material is sometimes referred to as "organic EC material".

[Construction of Organic EC Device]

Figure 1:
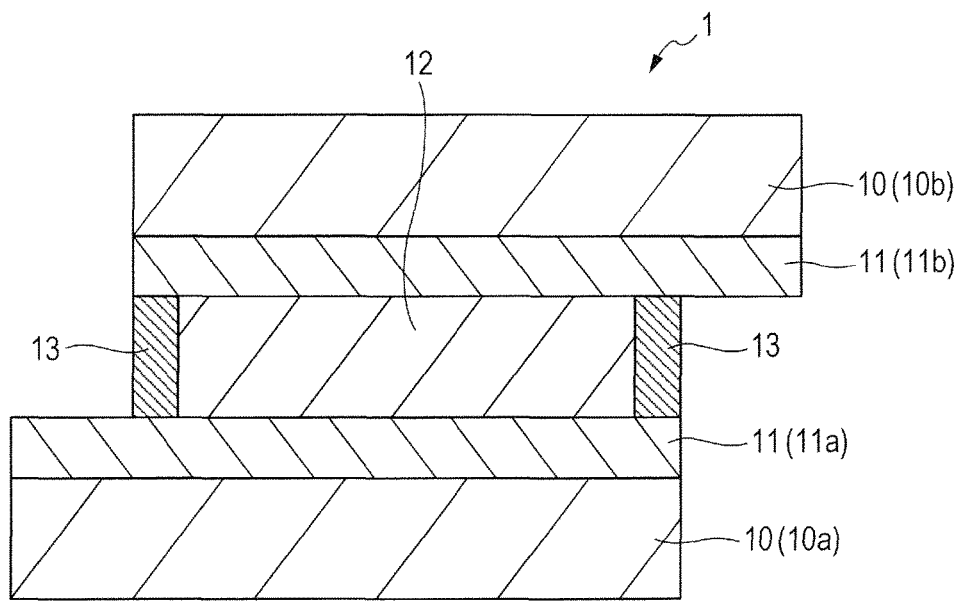
FIG. 1 is a cross-sectional schematic view for illustrating an example of an organic EC device according to an embodiment of the present invention.

FIG. 1 is a cross-sectional schematic view for illustrating an example of an organic EC device according to an embodiment of the present invention. An organic EC device 1 of FIG. 1 includes a pair of electrodes 11 and an electrochromic layer (EC layer) 12 arranged between the pair of electrodes 11.

In the organic EC device 1 of FIG. 1, each of the electrodes 11 is arranged on one surface of a substrate 10, and the two substrates 10 included in the organic EC device 1 are arranged so that the transparent electrodes 11 forming a pair are opposed to each other. In addition, the electrodes 11 are arranged so that an interelectrode distance becomes constant through the use of a sealing material 13, such as a spacer. It should be noted that in the following description, the two substrates 10 included in the organic EC device 1 are sometimes referred to as "first substrate 10a" and "second substrate 10b", respectively. In addition, the transparent electrodes 11 to be arranged on predetermined surfaces of the substrates (10a, 10b), respectively, are sometimes referred to as "first electrode 11a" and "second electrode 11b", respectively.

Next, the constituent members of the organic EC device of the present invention are described.

(1) Substrate

As each of the substrates 10 (10a, 10b) included in the organic EC device 1, a transparent substrate, such as colorless or colored glass or tempered glass, may be used, or a colorless or colored transparent resin may be used. It should be noted that the term "transparent" as used in the present invention refers to having a transmittance of 90% or more in terms of visible light transmittance.

Specific examples of the transparent resin to be used as the substrates 10 (10a, 10b) include polyethylene terephthalate, polyethylene naphthalate, polynorbornene, polyamide, polysulfone, polyether sulfone, polyether ether ketone, polyphenylene sulfide, polycarbonate, polyimide, and polymethyl methacrylate.

(2) Electrode

In the present invention, at least one of the two electrodes 11 (11a, 11b) included in the organic EC device is preferably a transparent electrode.

The term "transparent" as used in this case means transmitting light, and preferably refers to having a light transmittance of 50% or more and 100% or less. When at least one of the electrodes 11 (11a, 11b) is a transparent electrode as described above, light can be efficiently taken in from the outside of the organic EC device 1, and through an interaction with the EC material, the optical characteristics of the EC material can be reflected in output light. In addition, the light which is taken in by the organic EC device (light which is transmitted) refers to light in a wavelength region in which the organic EC device is intended to be used. For example, when the organic EC device is used as a filter of an imaging apparatus for a visible light region, the above-mentioned light refers to light in the visible light region, and when the organic EC device is used as a filter of an imaging apparatus for an infrared region, the light refers to light in the infrared region.

The transparent electrode to be used as each of the electrodes 11 (11a, 11b) is preferably a thin-layer electrode obtained by forming a transparent conductive oxide into a film on a substrate made of glass or a polymer compound, that is, a transparent conductive oxide electrode. Examples of the transparent conductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Of those, FTO or ITO is preferred.

In the present invention, a thickness of each of the electrodes 11 is preferably from 10 nm to 10,000 nm. In particular, an electrode formed of FTO or ITO having a thickness within the range of from 10 nm to 10,000 nm can achieve both a high transmission property and high chemical stability.

In the present invention, when the electrodes 11 are each formed of a transparent conductive oxide, the construction thereof may be a single-layer electrode layer formed of the transparent conductive oxide, or may be a laminated electrode layer which has a structure in which sublayers each formed of the transparent conductive oxide are laminated. Herein, when the laminated electrode layer is adopted as each of the electrodes 11, high conductivity and high transparency can be imparted to the organic EC device.

In the organic EC device 1 of FIG. 1, a preferred electrode is selected as any one of the two electrodes (11a, 11b) depending on the intended use of the organic EC device. For example, when the organic EC device of FIG. 1 is utilized as a transmission-type electrochromic device, both the electrodes 11 are preferably transparent electrodes, and both the electrodes 11 are more preferably transparent conductive oxide electrodes.

On the other hand, when the organic EC device of FIG. 1 is utilized as a reflection-type electrochromic device, it is preferred to adopt a light-transmissive electrode as one of the electrodes (for example, the first electrode 11a) and adopt a light-reflective electrode, which reflects light entering the organic EC device 1, as the other electrode (second electrode 11b).

Irrespective of which mode of device the organic EC device of the present invention is, it is preferred to use, as a constituent material for each of the electrodes 11, a material which is stably present in an environment in which the organic EC device is operated, and which can allow a redox reaction to progress quickly in response to the application of a voltage from the outside.

It should be noted that the organic EC device of the present invention may further include an electrode other than the two electrodes 11 (11a, 11b) illustrated in FIG. 1, as necessary. For example, the organic EC device may further include a reference electrode in order to obtain information on the potential of the EC layer 12. In addition, for example, for the purpose of separated coloration, one or both of the two electrodes 11 (11a, 11b) may be constituted of a plurality of electrode members.

(3) Sealing Material

The sealing material 13 included in the organic EC device 1 of FIG. 1 is preferably a material which is chemically stable, does not transmit gas and liquid, and does not inhibit the redox reaction of the organic EC material. For example, an inorganic material, such as glass frit, an organic material, such as an epoxy resin, or a metal material may be used. It should be noted that a function of keeping the interelectrode distance between the two electrodes (11a, 11b) may be imparted to the sealing material 13. On the other hand, when the sealing material 13 does not have imparted thereto a function of regulating the interelectrode distance between the two electrodes (11a, 11b), a spacer (not shown) may be separately arranged between the electrodes 11 to keep the distance between the electrodes 11 with the spacer.

As a material for the spacer to be used in such case, an inorganic material, such as silica beads or glass fibers, or an organic material, such as polydivinylbenzene, polyimide, polytetrafluoroethylene, fluororubber, or an epoxy resin may be used. With the spacer, the distance between the two electrodes included in the organic EC device can be regulated and kept.

(4) Interelectrode Distance

In the present invention, the interelectrode distance of the organic EC device is preferably 0.6 µm or more and 300 µm or less. When the interelectrode distance falls within this range, an amount of the organic EC material required to allow the organic EC device to effectively function is easily secured. Incidentally, according to the Lambert-Beer Law, the absorbance of a solution is proportional to the concentration of organic EC material molecules in a colored state, a molar absorption coefficient, and an optical path length (in this case, the interelectrode distance), and for example, increases along with an increase in amount of the organic EC material molecules in a colored state. Accordingly, the lower limit of the interelectrode distance is determined by the absorbance required of the organic EC device, the solubility of the organic EC material molecules in a colored state in a solvent, and the molar absorption coefficient. Now, the interelectrode distance is estimated. For example, suppose that the following parameters are given.

Required absorbance: 0.3 (transmittance: 50%)
Molar absorption coefficient: $4 \times 10^4$ $M^{-1}$ $cm^{-1}$
Concentration of organic EC material molecules in uncolored state: 0.25 M In this case, when the colored ratio of the EC material molecules is 50%, the preferred interelectrode distance is 0.6 µm or more.

Meanwhile, the preferred upper limit value of the interelectrode distance is an upper limit value associated with a response speed. An interelectrode distance within the range of preferred values results in a high response speed, and hence is preferred. Herein, the interelectrode distance may be estimated based on a period of time required for the bleaching of a cell (period of time until the concentration of the organic EC material in a colored state becomes 1/100). For example, when the diffusion coefficient of the organic EC material molecule is $2.0 \times 10^{-6}$ $cm^2$ $s^{-1}$ and the period of time until the concentration becomes 1/100 is 60 seconds, the preferred distance is 300 µm or less.

Herein, a small interelectrode distance is preferred from the viewpoint that the response speed of the organic EC device is improved. On the other hand, a large interelectrode distance is preferred from the viewpoints of the selection of the organic EC material molecules (expansion of the ranges of usable absorbances and solubilities) and the production of a filter having a higher absorbance (lower transmittance). In the present invention, the interelectrode distance is more preferably 2 μm (corresponding to a transmittance of 10%) or more and 200 μm or less, most preferably 4 μm (corresponding to a transmittance of 1%) or more and 130 μm or less.

(5) EC Layer

Next, the EC layer 12 included in the organic EC device 1 of FIG. 1 is described. In the present invention, the EC layer 12 contains a solvent, an organic EC material, and a redox substance.

(5-1) Solvent

The solvent to be contained in the EC layer 12 is selected depending on the intended use in consideration of, for example, the solubilities, vapor pressures, viscosities, and potential windows of solutes including the organic EC material and the redox substance, which are described later, and is preferably a solvent having polarity. Specific examples thereof include water and organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane.

(5-2) Organic EC Material

The organic EC material to be contained in the EC layer 12 is a low-molecular-weight organic compound having a molecular weight of 2,000 or less and whose molecule is colored/bleached through an oxidation reaction (reaction based on the emission of an electron at an anode) or a reduction reaction (reaction based on the acceptance of an electron at a cathode) at one of the electrodes 11.

The organic EC material is classified into an anodic organic EC material, which reversibly changes from a bleached state to a colored state through an oxidation reaction at one of the electrodes 11, and a cathodic organic EC material, which reversibly changes from a bleached state to a colored state through a reduction reaction at one of the electrodes 11. It should be noted that the EC layer 12 only needs to contain the anodic organic EC material or the cathodic organic EC material, and does not need to include both the anodic organic EC material and the cathodic organic EC material. In this regard, however, in the present invention, the EC layer 12 may contain both the anodic organic EC material and the cathodic organic EC material.

Examples of the anodic organic EC material include amines each having an aromatic ring (such as a phenazine derivative and a triallylamine derivative), a thiophene derivative, a pyrrole derivative, a thiazine derivative, a triallylmethane derivative, a bisphenylmethane derivative, a ferrocene derivative, a xanthene derivative, a fluoran derivative, and a spiropyran derivative. Of those, low-molecular-weight amines each having an aromatic ring (such as a phenazine derivative and a triallylamine derivative) and a thiophene derivative are preferred. The term "low-molecular-weight" as used herein refers to a molecular weight of 2,000 or less, preferably 1,000 or less.

The use of any of the compounds and the derivatives listed above in the EC layer 12 facilitates the provision of a desired absorption wavelength profile.

In a neutral state, any such molecule has an absorption peak in an ultraviolet region, hardly has absorption in a visible light region, and assumes a bleached state having a high transmittance in the visible light region. In addition, through an oxidation reaction, the molecule is converted into a radical cation to shift the absorption to the visible light region, resulting in a colored state. The absorption wavelength of the molecules may be designed by increasing or decreasing its π-conjugation length, or changing substituents to make a change to the π-conjugation system.

Herein, oligothiophene is a compound containing 2 or more and 9 or less thiophene rings per molecule, and a more preferred range of the number of thiophene rings contained is 2 or more and 5 or less. In addition, thienoacene is a fused polycyclic heterocyclic compound having a fused ring structure containing a thiophene ring, such as thienothiophene or dithienothiophene.

A substituent which a monothiophene derivative, an oligothiophene derivative, and a thienoacene derivative may have is not particularly limited and examples thereof include substituents listed below. That is, examples of the substituent include an alkyl group having 1 or more and 20 or less carbon atoms, an alkoxy group having 1 or more and 20 or less carbon atoms, an alkyl ester group having 1 or more and 20 or less carbon atoms, an aryl group which may have a substituent, and an amino group or a cyano group which may have a substituent.

Examples of the cathodic organic EC material include a pyridine derivative, such as a viologen compound, and a quinone compound.

(5-3) Redox Substance

The redox substance to be contained in the EC layer 12 included in the organic EC device of the present invention is a substance which is reversibly oxidized or reduced on one of the electrodes 11. Herein, the redox substance may be an EC material, or may not be an EC material. Not being an EC material means that an absorbance change caused by a redox reaction is small in a wavelength region in which the organic EC device is intended to be used. Specifically, the redox substance which is not an EC material refers to a substance whose peak change amount of the molar absorption coefficient caused by the redox reaction in the above-mentioned wavelength region is ¼ or less, preferably ⅒ or less, as compared to one having the largest peak change amount among EC materials used in the organic EC device.

The kind of the redox substance is not limited as long as the redox substance is capable of being present in a stable state in the solvent under the driving conditions of the organic EC device and satisfies the other requirements of the present invention. However, the redox substance is used in an organic EC device and does not show an EC characteristic (characteristic which changes the absorbance of the EC layer 12, such as a coloration property), and hence one having a small absorbance in the wavelength range in which the organic EC device is intended to be used is preferably used.

In addition, the redox substance is classified into an oxidized form and a reduced form based on the properties of the substance itself when a voltage is applied to the EC layer 12 under a state in which the EC layer 12 is transparent (initial state). The oxidized form is a substance which is reduced through an electrode reaction when a voltage applied under the initial state (cathodic). In addition, the reduced form is a substance which is oxidized through an electrode reaction when a voltage is applied under the initial state (anodic). In the present invention, when an anodic organic EC material is used as the organic EC material, a redox substance which is in the reduced form at least under the initial state (anodic) is used. In addition, when a cathodic organic EC material is used as the organic EC material, a redox substance which is in the oxidized form at least under the initial state (cathodic) is used.

In addition to the EC materials, a specific example of the redox substance may be a metal complex compound. A more specific example thereof may be a metal complex compound containing any one of Os, Fe, Ru, Co, Cu, Ni, V, Mo, Cr, Mn, Pt, Rh, Pd, and Ir as a metal ion. A specific example thereof may be a metal complex containing a metallocene compound or a heterocyclic compound as a ligand. Examples of the heterocyclic compound serving as the ligand of the metal complex may include bipyridine, terpyridine, and phenanthroline.

In addition, in the present invention, the redox substance may be a compound similar to the organic EC material, the compound not showing an EC characteristic in the wavelength range in which the organic EC device is intended to be used.

(6) Additive to be Contained in EC Layer

In the present invention, the EC layer 12 may further contain additives described below in addition to the solvent, the organic EC material, and the redox substance described above.

(6-1) Polymer, Gelling Agent

The EC layer 12 may further contain a polymer or a gelling agent in addition to the solvent to make the EC layer 12 itself a highly viscous member or a gel-like member. The polymer which may be contained in the EC layer 12 is not particularly limited. Examples thereof include polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion (trade name).

(6-2) Supporting Electrolyte

The EC layer 12 may further contain a supporting electrolyte as necessary. The supporting electrolyte is specifically an ion dissociable salt, and is not particularly limited as long as the supporting electrolyte is a substance which shows satisfactory solubility in the solvent (high compatibility in a solid electrolyte) and is stable at the operation potential of the organic EC device. Suitable ones selected from various cations and anions may be used in combination as the supporting electrolyte. Examples of the cation include various alkali metal and alkaline earth metal ions and quaternary ammonium ions. Specific examples thereof may include ions of Li, Na, K, Ca, Ba, tetramethylammonium, tetraethylammonium, tetrabutylammonium, or the like. Examples of the anion include anions of various fluorine compounds and halide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$.

(7) Method of Forming EC Layer

The EC layer 12 is formed by, for example, a method described below. First, the substrates 10 having the electrodes 11, and the sealing material 13 are bonded so that, as illustrated in FIG. 1, the electrodes (11a, 11b) are opposed to each other with a constant distance, to thereby produce a cell. It should be noted that in the production of the cell, an opening (not shown) for introducing the constituent materials for the EC layer 12 into the cell is formed. Next, the constituent materials for the EC layer 12 are injected to fill the cell through the opening by a vacuum injection method, an atmospheric injection method, a meniscus method, or the like, and then the opening is sealed. Thus, the EC layer 12 may be formed.

[Organic EC Material, Redox Substance]

Next, two kinds of materials to be contained in the EC layer included in the organic EC device of the present invention, i.e., the organic EC material and the redox substance are described in detail.

[1] Reactions of Organic EC Material and Redox Substance, and Redox Potentials

Figure 2:
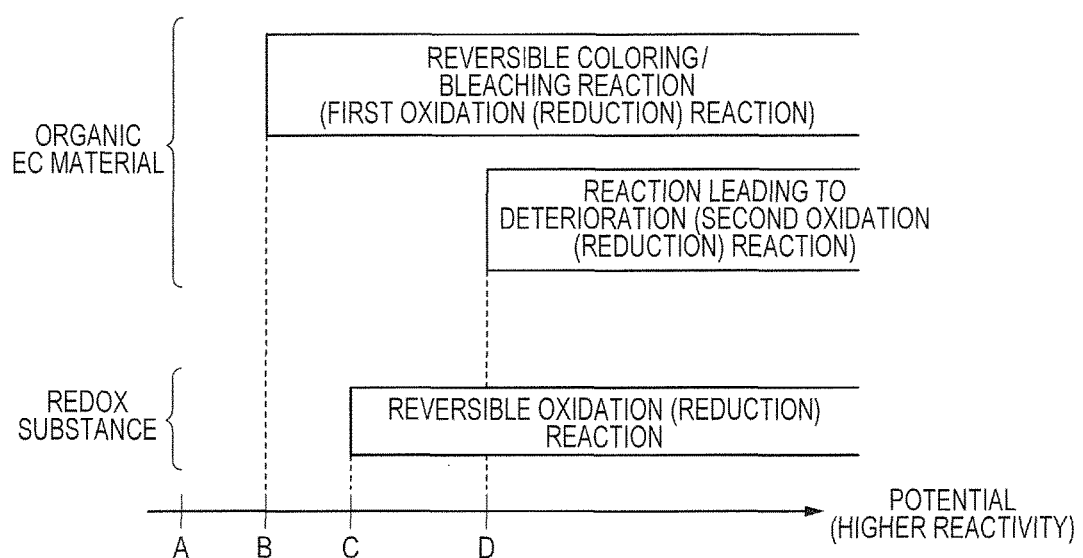
FIG. 2 is a diagram for illustrating potential regions in which the redox reactions of an organic EC material and a redox substance occur.

FIG. 2 is a diagram for illustrating potential regions in which the redox reactions of the organic EC material and the redox substance occur. In FIG. 2, the right direction means a direction in which energy contributing to the reaction in the redox reaction increases. Specifically, in the case of an anodic material which is oxidized by losing an electron through an electrode reaction, the right direction in FIG. 2 indicates a positive direction (the potential increases in the plus direction). In addition, in the case of a cathodic material which is reduced by receiving an electron through an electrode reaction, the right direction in FIG. 2 indicates a negative direction (the potential increases in the minus direction).

Now, the case of the anodic material is described with reference to FIG. 2. It should be noted that matters in the following description are common to the cathodic material except for the direction in which the potential increases, and hence, in the following description, the case of the cathodic material is sometimes also described with "or" in parentheses.

The potential of an electrode in contact with a solvent containing an anodic (or cathodic) organic EC material is shifted from a potential A on a negative (or positive) side where reactivity is relatively low toward a positive (or negative) side. Then, at a potential B, a reversible oxidation (or reduction) reaction of the organic EC material progresses to color the organic EC material.

After that, when the potential is further shifted toward the positive (or negative) side until the potential reaches a potential D in FIG. 2, a reaction leading to deterioration progresses in the organic EC material, which increases a risk of leading to the deterioration of the characteristics of the organic EC material.

In this regard, however, in an electrochemical redox reaction, the potential at which the redox reaction occurs is not limited to a fixed point and has an extension in the vicinity of the fixed point. Accordingly, the potential at which the reaction leading to the deterioration of the organic EC material progresses also has an extension in the vicinity of the potential D. Therefore, when a potential in the vicinity of the potential D is applied to the organic EC device, even if the applied potential is lower than the potential D, the reaction leading to deterioration progresses though with a small probability and an irreversible redox reaction may occur. That is, it is considered that the application of a potential in the vicinity of D in FIG. 2 or higher than D to the organic EC device leads to the manifestation of the deterioration of the characteristics of the organic EC device when the organic EC device is repeatedly operated for a long period of time.

In the present invention, a redox substance which is oxidized (or reduced) between the potential at which the reversible oxidation (or reduction) reaction of the organic EC material starts to occur and the potential at which its irreversible oxidation (or reduction) reaction starts to occur described above is allowed to be present in the electrolyte (EC layer 12). That is, a redox substance which is oxidized (or reduced) at a potential (for example, the potential C) at which the reversible oxidation (or reduction) reaction of the organic EC material occurs but its irreversible oxidation (or reduction) reaction does not occur is allowed to be present in the electrolyte (EC layer 12). Consequently, the oxidation (or reduction) reaction of the redox substance occurs preferentially to the irreversible oxidation (or reduction) reaction of the organic EC material. Thus, the deterioration of the organic EC material can be prevented, and hence the organic EC device of the present invention is excellent in durability.

As an example in which the above-mentioned concept is carried out, the following modes may be given.

(A) In order to generate the maximum contrast when driving the organic EC device, a charge amount required to allow the maximum progress possible of the coloring/bleaching reaction which occurs at the potential B (reversible oxidation (or reduction) reaction of the organic EC material) needs to be supplied to the organic EC device. In this regard, however, when a charge amount which is even slightly larger than the charge amount required to allow the maximum progress possible of the coloring/bleaching reaction which occurs at the potential B is supplied, the reaction leading to the deterioration of the organic EC material progresses consequently. This is because an increase in value of current naturally increases the applied voltage, resulting in an increase in energy of the potential to be applied to the organic EC material. For example, the case where a state having a large coloration amount (colored state) is kept for a long period of time or the case where coloration and decoloration are repeated is discussed. Organic compounds to be used for organic EC devices basically have high durability against redox reactions to be repeatedly performed, but there is no material which is completely free of deterioration, irrespective of whether the material is organic or inorganic. That is, the number of coloration-active molecules is considered to be decreasing though at a low rate (it should be noted that there may be a material which may be said to be free of "deterioration" as long as the material is used practically). In this case, when the number of active molecules falls short of a number required to exhibit a certain large coloration amount, the supplied charge results in an increase in potential to be applied to the organic EC device, and the charge is used in the reaction leading to the deterioration of the organic EC material. In this case, when the redox substance having a redox potential which is present between the potential B and the potential D in FIG. 2 (for example, the potential C) is present in the electrolyte (EC layer 12), the organic EC material can be protected within the range of the charge amount to be used in the oxidation (or reduction) reaction of the redox substance.

(B) In the case where a light transmittance or the like is measured during the driving of the organic EC device and a voltage to be applied to the organic EC device is changed depending on the measurement result, the application amount of the voltage required to maintain a predetermined light transmittance may increase with driving time of the organic EC device. As a result, the potential of an electrode may increase to the potential at which the reaction leading to the deterioration of the organic EC material progresses. In this case as well, when the redox substance having a redox potential which is present between the potential B and the potential D in FIG. 2 (for example, the potential C) is present in the electrolyte (EC layer 12), the oxidation (or reduction) reaction of the redox substance more easily occurs than the reaction leading to the deterioration of the organic EC material in terms of potential. Consequently, the oxidation (or reduction) reaction of the redox substance progresses preferentially to the reaction leading to the deterioration of the organic EC material, and hence the organic EC material can be protected.

[2] Requirements Imposed on Material to be Contained in EC Layer in the Present Invention In order to carry out the mode (A) or (B) described above, it is necessary to satisfy three requirements (1) to (3) regarding the redox substance described below. It should be noted that, of the following requirements, the requirements (1) and (2) are needed from the viewpoint of a potential, and the requirement (3) is needed from the viewpoint of a charge balance.

(1) The oxidation (or reduction) reaction of the redox substance less easily occurs than the reversible oxidation (or reduction) reaction of the organic EC material in terms of potential.

The reason why the requirement (1) is needed is described below. When the oxidation (or reduction) reaction of the redox substance more easily occurs than the reversible oxidation (or reduction) reaction (reversible coloring reaction) of the organic EC material in terms of potential, the reaction of the redox substance progresses preferentially to the reaction of the organic EC material. In this case, at least part of the charge to be used in the reversible coloring reaction of the organic EC material is used in the reaction of the redox substance. In this case, a further charge supply for compensating for the shortage of the charge causes a decrease in absorbance of the organic EC material, an increase in power consumption (decrease in duration of a storage battery), or the like. In addition, when the oxidation (or reduction) reaction of the redox substance occurs as easily as the reversible coloring reaction of the organic EC material in terms of potential, the oxidation (or reduction) reaction of the redox substance progresses to the same degree as the reversible coloring reaction of the organic EC material. Consequently, although the degree is lessened as compared to the above-mentioned conditions, the decrease in absorbance of the organic EC material or the increase in power consumption is caused. Therefore, in order to avoid the above-mentioned situation, it is necessary that the oxidation (or reduction) reaction of the redox substance less easily occur than the reversible oxidation (or reduction) reaction (reversible coloring reaction) of the organic EC material in terms of potential.

(2) The oxidation (or reduction) reaction of the redox substance more easily occurs than the oxidation (or reduction) reaction leading to the deterioration of the organic EC material (irreversible oxidation (or reduction) reaction) in terms of potential.

The reason why the requirement (2) is needed is described below. When the oxidation (or reduction) reaction leading to the deterioration of the organic EC material more easily occurs than the oxidation (or reduction) reaction of the redox substance in terms of potential, the oxidation (or reduction) reaction leading to the deterioration of the organic EC material progresses preferentially to the oxidation (or reduction) reaction of the redox substance. Under the situation in which the irreversible oxidation (or reduction) reaction of the organic EC material occurs preferentially as just described, the reaction leading to the deterioration of the organic EC material cannot be effectively suppressed. In addition, when the oxidation (or reduction) reaction leading to the deterioration of the organic EC material occurs as easily as the oxidation (or reduction) reaction of the redox substance in terms of potential, the reaction leading to the deterioration of the organic EC material progresses to the same degree as the oxidation (or reduction) reaction of the redox substance. Consequently, although the degree is lessened as compared to the above-mentioned conditions, the reaction leading to the deterioration of the organic EC material cannot be effectively suppressed. Therefore, in order to avoid the deterioration of the organic EC material caused by the irreversible oxidation (or reduction) reaction, it is necessary that the oxidation (or reduction) reaction of the redox substance more easily occur than the oxidation (or reduction) reaction leading to the deterioration of the organic EC material in terms of potential.

(3) The oxidation (or reduction) reaction of the redox substance is reversible.

Figure 3A:
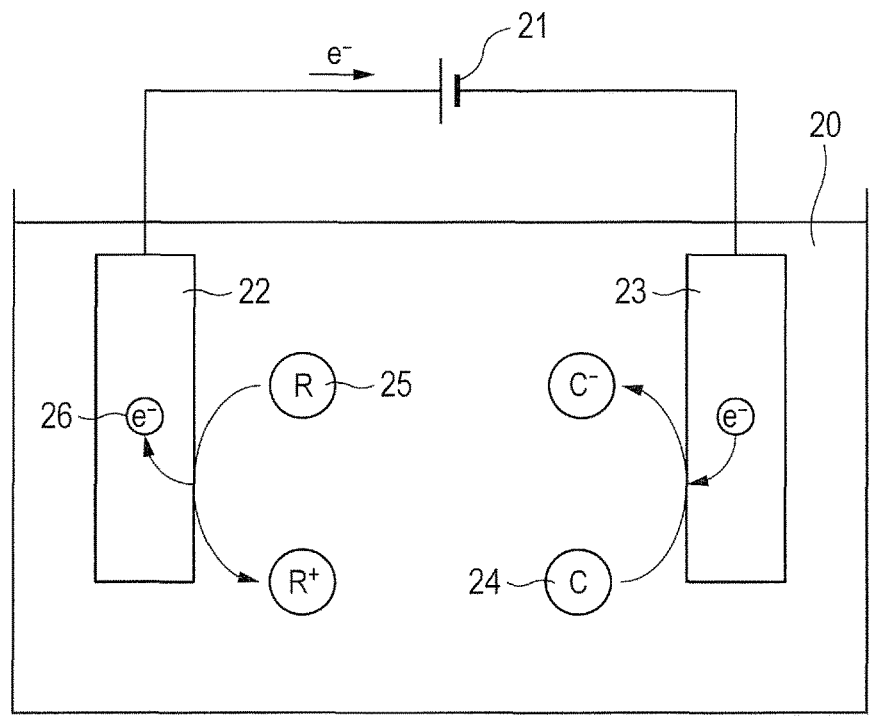
FIG. 3A and FIG. 3B are schematic views for illustrating an electrochemical reaction which occurs in a solution contained in an EC layer included in an organic EC device.
Figure 3B:
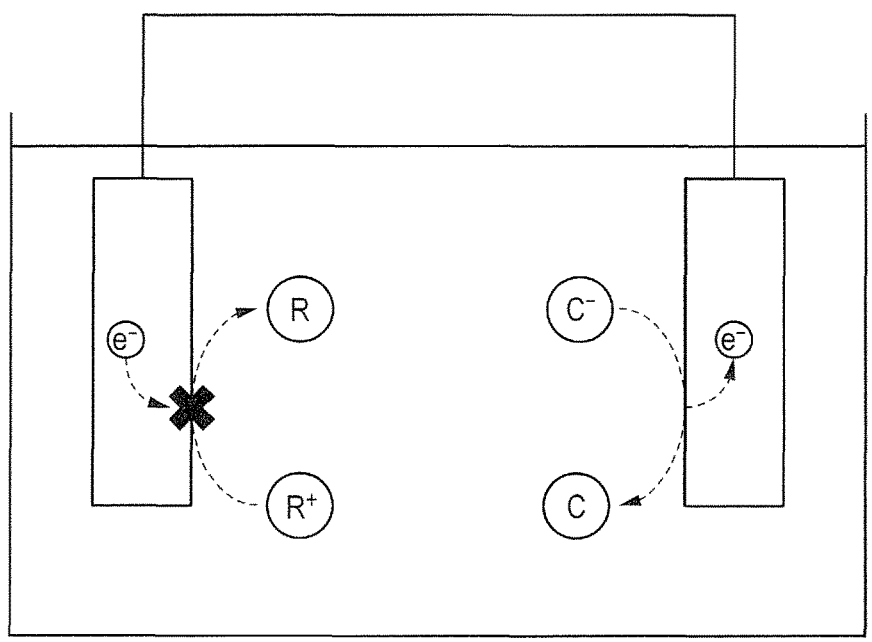

The reason why the requirement (3) is needed is described below. When the reaction of the redox substance is irreversible (sacrificial), the charge input-output balance of the organic EC device is disrupted along with the progress of the oxidation (or reduction) reaction of the redox substance. FIG. 3A and FIG. 3B are schematic views for illustrating an electrochemical reaction which occurs in a solution 20 contained in the EC layer included in the organic EC device. It should be noted that FIG. 3A is an illustration of an example in which when a constant voltage is applied from a power source 21, an oxidation reaction represented by the following formula (3-1) progresses for a redox substance 25 and a reduction reaction represented by the following formula (3-2) progresses for the organic EC material.

$$R \rightarrow R^+ + e^- \quad (3\text{-}1)$$

$$C + e^- \rightarrow C^- \quad (3\text{-}2)$$

In this case, when the reaction of the redox substance 25 (oxidation reaction of the formula (3-1)) progresses at an anode 22, an electron 26 recovered by the anode 22 through this reaction is supplied to an organic EC material 24 on a cathode 23 side and the reduction reaction of the formula (3-2) progresses. As a result, the organic EC material 24 is colored.

In this case, when the reaction of the formula (3-1) is an irreversible reaction, as illustrated in FIG. 3B, even when an attempt is made to reoxidize the organic EC material 24 colored by the supply of the electron 26, the redox substance 25 to which the electron is supplied (from which the electron is supplied) is deactivated through the above-mentioned irreversible reaction. In such case, in the solution 20 in FIG. 3A and FIG. 3B, the organic EC material 24 is brought into a state of remaining colored and not being bleached, with the result that the function of the organic EC device is lost. Also in the case of a unipolar-type organic EC device, in the electrode opposite in polarity to the electrode at which the organic EC material reacts, a charge remains and the function of the organic EC device is lowered. To avoid this, it is necessary that the oxidation (or reduction) reaction of the redox substance be reversible. In addition, imposing this requirement means that the redox substance to be contained in the organic EC device of the present invention differs from a sacrificial oxidation inhibitor or reduction inhibitor which is sometimes used in an organic EC device.

In addition, in order to more effectively carry out the mode (A) or (B), it is desirable to satisfy the following requirement (4).

(4) The redox substance is free of electrochemical oxidation (or reduction) at the potential at which the organic EC material starts to be reversibly oxidized (or reduced).

The reason why this requirement is important is similar to the reason for the requirement (1). That is, in the case where only the reversible oxidation (or reduction) reaction of the organic EC material occurs (the potential is present between B and D in FIG. 2), when the oxidation (or reduction) reaction of the redox substance is always occurring, a state in which the reaction of the organic EC material and the reaction of the redox substance are always competitively occurring is established. In this case, the redox substance to be added to the EC layer 12 improves the durability of the organic EC device, but at the same time, increases power consumption. It should be noted that the above-mentioned power consumption-increasing effect is small as compared to the negative effect in the case of not satisfying the requirement (1), but should be prevented from the viewpoint of improving the function of the organic EC device. Thus, it is desirable that the redox substance be free of electrochemical oxidation (or reduction) at the potential at which the organic EC material starts to be reversibly oxidized (or reduced), that is, the potential B in FIG. 2. Specifically, a material whose redox potential (C in FIG. 2) is shifted toward the positive (or negative) direction with respect to the potential at which the organic EC material is reversibly oxidized (or reduced) (B in FIG. 2) is used as the redox substance. With this, the organic EC device can be driven under a state in which this requirement is satisfied. In addition, in this case, the durability can be improved while the increase in power consumption is suppressed through the addition of the redox substance. It should be noted that the potential at which the organic EC material or the redox substance starts to be oxidized (or reduced) may be evaluated by electrochemical measurement. For example, the potential may be defined as a potential at which an oxidation reaction or reduction reaction of the organic EC material or the redox substance is initiated in cyclic voltammogram measurement involving sweeping a voltage at a constant rate. The potential can be measured more accurately when the voltage sweep rate is lower. Specifically, the rate is preferably about 10 mV/s or less, more preferably about 1 mV/s or less.

[3] Analysis Method for Redox Reaction

In the present invention, whether the oxidation (or reduction) reaction of each of the organic EC material and the redox substance is reversible or irreversible may be determined based on at what ratio the substance in question before the cycle is regenerated when the substance undergoes 1 cycle of oxidation/reduction (or reduction/oxidation) reactions. For example, that the organic EC material is reversibly colored means that under conditions for driving the organic EC device, the organic EC material is regenerated to such a degree as to satisfy cycle stability required of the device even after the organic EC material has undergone a certain number of redox cycles.

A specific value of a regeneration ratio indicating that the oxidation (or reduction) reaction of a predetermined material (organic EC material or redox substance) is reversible varies depending on the device, but is for example, 90% or more, preferably 99% or more, most preferably 99.9% or more. The regeneration ratio may be measured by, for example, comparing amounts of charges used in the oxidation reaction and the reduction reaction to each other based on electrochemical measurement, specifically a potential step method (chronoamperometry, chronocoulometry), cyclic voltammogram, or the like.

In addition, when repeated measurement to be performed in the evaluation of the regeneration ratio is performed, the regeneration ratio may also be evaluated by comparing a charge amount used in an oxidation (or reduction) reaction observed in a previous cycle to a charge amount used in an oxidation (or reduction) reaction observed in a later cycle.

Further, the following is also preferably performed: electrochemical measurement is performed while a change in absorption spectrum of the solution contained in the EC layer 12 is monitored, and thereby a comparison is performed using the absorbance of the solution. As an example of a specific method, in three-electrode cell measurement with a reference electrode for a solution containing the organic EC material, charge amounts involved in redox reactions described in the following (ia) and (ib) are compared.

(ia) A charge amount to be used when the potential is changed from a potential at which substantially all the organic EC material is oxidized to a potential at which substantially all the organic EC material is reduced (ib) A charge amount to be used when the potential is changed from a potential at which substantially all the organic EC material is reduced to a potential at which substantially all the organic EC material is oxidized

[Requirements regarding Redox Substance]

[1] Case where Oxidation (or Reduction) Reactions of Organic EC Material are Considered to be Reversible/Irreversible System Next, in the case where the oxidation (or reduction) reactions of the organic EC material are considered to be a system in which the reversible reaction and the irreversible reaction progress in the stated order from a lower charge amount to be applied to the organic EC material (reversible/irreversible system), requirements regarding the redox substance are described.

(a) Case where Organic EC Material is Anodic Material

In the case where the organic EC material is an anodic material and the oxidation (or reduction) reactions of the organic EC material are a reversible/irreversible system, the oxidation reaction of the redox substance less easily occurs than the oxidation reaction in which the organic EC material is reversibly colored in terms of potential. Meanwhile, the oxidation reaction of the redox substance more easily occurs than the irreversible oxidation reaction (second oxidation reaction or the like) of the organic EC material in terms of potential.

Now, the ease of occurrence of the reaction (oxidation reaction) of the redox substance is described below from the viewpoint of a redox potential. It should be noted that the ease of occurrence of the reaction as used herein may be evaluated by electrochemical measurement. For example, the ease of occurrence of the reaction may be evaluated by performing cyclic voltammogram measurement for each of the organic EC material and the redox substance.

When the organic EC material is an anodic material, it is preferred that based on the above-mentioned measurement, the half-wave potential of the reversible oxidation reaction of the redox substance be on the positive side with respect to the half-wave potential of the oxidation reaction in which the organic EC material is reversibly colored. This means that the oxidation reaction of the redox substance less easily occurs than the reversible oxidation reaction (reversible coloring reaction) of the organic EC material in terms of potential.

In addition, in such case, the half-wave potential of the reversible oxidation reaction of the redox substance is preferably on the negative side with respect to the potential at which a current resulting from the irreversible oxidation reaction of the organic EC material rises. This means that the oxidation reaction of the redox substance more easily occurs than the irreversible oxidation reaction of the organic EC material in terms of potential.

When the cyclic voltammogram measurement is performed, at least a working electrode and a counter electrode are prepared. As the working electrode, an electrode formed of a material similar to the constituent material for each of the electrodes included in the organic EC device is preferably used. For example, when the electrodes of the organic EC device are FTO electrodes, an electrode having FTO is used as the working electrode. As the counter electrode, for example, a platinum electrode having a sufficient area is preferably used. In addition, as a solvent or a supporting electrolyte to be used in the measurement, one similar to the solvent or the supporting electrolyte to be contained in the EC layer included in the organic EC device is preferably used. In addition, the sweep rate of the voltammogram is preferably set as appropriate within the range of, for example, from 20 mVs$^{-1}$ to 200 mVs$^{-1}$.

(b) Case where Organic EC Material is Cathodic Material

In such case, the reduction reaction of the redox substance less easily occurs than the reduction reaction in which the organic EC material is reversibly colored in terms of potential, whereas the reduction reaction more easily occurs than the irreversible reduction reaction of the organic EC material in terms of potential.

In such case, the ease of occurrence of the reaction (reduction reaction) of the redox substance in terms of potential may be considered in the same manner as in the case (a). Specifically, in the above-mentioned cyclic voltammogram measurement, the half-wave potential of the reversible reduction reaction of the redox substance is preferably on the negative side with respect to the half-wave potential of the reduction reaction in which the organic EC material is reversibly colored. This means that the reduction reaction of the redox substance less easily occurs than the reversible reduction reaction (reversible coloring reaction) of the organic EC material in terms of potential.

In addition, in the present invention, the half-wave potential of the reversible reduction reaction of the redox substance is preferably on the positive side with respect to the potential at which a current resulting from the reaction in which the organic EC material is irreversibly reduced rises. This means that the reduction reaction of the redox substance more easily occurs than the irreversible reduction reaction of the organic EC material in terms of potential.

(c) Case where EC Layer Contains Anodic Organic EC Material and Cathodic Organic EC Material In the present invention, the number of kinds of the organic EC materials to be contained in the EC layer included in the organic EC device is not limited to one, and may be two or more. When a plurality of kinds of the organic EC materials are contained in the EC layer as just described, a plurality of kinds (at least two kinds) of the redox substances are contained in the EC layer correspondingly to the kinds of the organic EC materials.

The oxidation reaction of the redox substance corresponding to an anodic organic EC material less easily occurs than the oxidation reaction in which the anodic organic EC material is reversibly colored in terms of potential. Meanwhile, the oxidation reaction of this redox substance more easily occurs than the irreversible oxidation reaction of the anodic organic EC material in terms of potential.

In addition, the reduction reaction of the redox substance corresponding to a cathodic organic EC material less easily occurs than the reduction reaction in which the cathodic organic EC material is reversibly colored in terms of potential. Meanwhile, the reduction reaction of this redox substance more easily occurs than the irreversible reduction reaction of the cathodic organic EC material in terms of potential.

Thus, in an organic EC device containing both the anodic organic EC material and the cathodic organic EC material in the EC layer, through the use of the redox substances corresponding to the respective organic EC materials, the irreversible reaction of each organic EC material can be effectively prevented. It should be noted that their relationship in terms of potential may be considered in the same manner as in the case (a) or (b).

[2] Case where Oxidation (or Reduction) Reactions of Organic EC Material are Considered to be System in which Order of Ease of Occurrence is "First Oxidation (or Reduction) Reaction, Second Oxidation (or Reduction) Reaction"

Next, in the case where the oxidation (or reduction) reactions of the organic EC material are considered to be a system in which the order of ease of occurrence is "first oxidation (or reduction) reaction, second oxidation (or reduction) reaction," requirements regarding the redox substance are described.

In this system, the oxidation (or reduction) reaction of the redox substance less easily occurs than the first oxidation (or reduction) reaction of the organic EC material in terms of potential, but more easily occurs than the second oxidation (or reduction) reaction of the organic EC material in terms of potential.

Herein, the first oxidation (or reduction) reaction of the organic EC material is an oxidation (or reduction) reaction which the organic EC material generally first undergoes when the potential difference between the electrodes is increased at a constant rate among electrochemical reactions observed in the solution to be used in the organic EC device. It should be noted that in the organic EC material, in addition to the first oxidation (or reduction) reaction, the second oxidation (or reduction) reaction is often observed on a more positive (or negative) potential side.

However, the second oxidation (or reduction) reaction of the organic EC material has the following problems, and hence in the organic EC device of the present invention, the coloring/bleaching of the organic EC device is in many cases performed using the first oxidation (or reduction) reaction.

(i) The second oxidation (or reduction) reaction progresses through the application of high energy to the organic EC device as compared to the first oxidation (or reduction) reaction. Accordingly, as compared to the first oxidation (or reduction) reaction, owing to the high energy to be applied to the organic EC device, there is a higher risk of the occurrence of decomposition or a side reaction, leading to the deterioration of the organic EC material.

(ii) The absorption spectrum of a second oxidized form (or second reduced form) which is a product of the second oxidation (or reduction) reaction differs from that of a first oxidized form (or first reduced form) which is a product of the first oxidation (or reduction) reaction. Therefore, when the second oxidation (or reduction) reaction progresses, the color of the organic EC device is changed.

(iii) The occurrence of the second oxidation (or reduction) reaction requires a larger charge (current) as compared to the case of causing the first oxidation (or reduction) reaction to progress. In addition, higher energy (potential difference) is required for the progress of the reaction as compared to the first oxidation (or reduction) reaction. Consequently, the power consumption amount of the organic EC device is increased.

In the present invention, through the use of a redox substance which satisfies requirements described below in addition to the organic EC material, the progress of the second oxidation (or reduction) reaction of the organic EC material can be avoided.

(a) Case where Organic EC Material is Anodic Material

In such case, the organic EC material has a first oxidation potential which is the potential of the first oxidation reaction, and a second oxidation potential which is the potential of the second oxidation reaction. In addition, in such case, as the redox substance, there is used a material whose oxidation reaction less easily occurs than the first oxidation reaction of the organic EC material in terms of potential, and whose oxidation reaction more easily occurs than the second oxidation reaction of the organic EC material in terms of potential. This means that the oxidation potential of the redox substance (potential at which the redox substance is oxidized) is present between the first oxidation potential and the second oxidation potential.

In addition, the ease of occurrence of the oxidation reaction in such case viewed in terms of potential may be considered in the same manner as in the case where the oxidation reactions of the organic EC material are the reversible/irreversible system described above. Specifically, in the above-mentioned electrochemical measurement, the half-wave potential of the reversible oxidation reaction of the redox substance is preferably on the positive side with respect to the half-wave potential of the oxidation reaction corresponding to the first oxidation reaction of the organic EC material. This means that the oxidation reaction of the redox substance less easily occurs than the first oxidation reaction of the organic EC material in terms of potential.

In addition, the half-wave potential of the reversible oxidation reaction of the redox substance is preferably on the negative side with respect to the half-wave potential of the second oxidation reaction of the organic EC material. This means that the oxidation reaction of the redox substance more easily occurs than the second oxidation reaction of the organic EC material in terms of potential.

(b) Case where Organic EC Material is Cathodic Material

In such case, the organic EC material has a first reduction potential which is the potential of the first reduction reaction, and a second reduction potential which is the potential of the second reduction reaction. In a system in which the second reduction reaction of the organic EC material may occur in addition to the first reduction reaction, as the redox substance, there is used a material whose reduction reaction less easily occurs than the first reduction reaction of the organic EC material in terms of potential, and whose reduction reaction more easily occurs than the second reduction reaction of the organic EC material in terms of potential. This means that the reduction potential of the redox substance (potential at which the redox substance is reduced) is present between the first reduction potential and the second reduction potential.

In addition, the ease of occurrence of the reduction reaction in this case viewed in terms of potential may be considered in the same manner as in the case (a). Specifically, in the above-mentioned electrochemical measurement, the half-wave potential of the reversible reduction reaction of the redox substance is preferably on the positive side with respect to the half-wave potential of the first reduction reaction of the organic EC material. This means that the reduction reaction of the redox substance less easily occurs than the first reduction reaction of the organic EC material in terms of potential.

In addition, the half-wave potential of the reversible reduction reaction of the redox substance is preferably on the negative side with respect to the half-wave potential of the second reduction reaction of the organic EC material. This means that the reduction reaction of the redox substance more easily occurs than the second reduction reaction of the organic EC material in terms of potential.

(c) Case where EC Layer Contains Anodic Organic EC Material and Cathodic Organic EC Material In the present invention, the number of kinds of the organic EC materials to be contained in the EC layer is not limited to one, and may be two or more. When a plurality of kinds of the organic EC materials are contained in the EC layer as just described, a plurality of kinds (at least two kinds) of the redox substances are contained in the EC layer correspondingly to the kinds of the organic EC materials.

The oxidation reaction of the redox substance corresponding to an anodic organic EC material less easily occurs than the first oxidation reaction of the anodic organic EC material in terms of potential. Meanwhile, the oxidation reaction of this redox substance more easily occurs than the second oxidation reaction of the anodic organic EC material in terms of potential.

In addition, the reduction reaction of the redox substance corresponding to a cathodic organic EC material less easily occurs than the first reduction reaction of the cathodic organic EC material in terms of potential. Meanwhile, the reduction reaction of this redox substance more easily occurs than the second reduction reaction of the cathodic organic EC material in terms of potential.

Thus, in an organic EC device containing both the anodic organic EC material and the cathodic organic EC material in the EC layer, through the use of the redox substances corresponding to the respective organic EC materials, the second oxidation (or reduction) reaction of each organic EC material can be effectively prevented. It should be noted that their relationship in terms of potential may be considered in the same manner as in the case (a) or (b).

[3] Requirements Imposed on Redox Substance so as Not to Inhibit Reaction of Organic EC Material In the case where the redox substance is also oxidized (or reduced) under conditions under which the organic EC material is reversibly oxidized (or reduced) in the driving of the organic EC device of the present invention, the addition of the redox substance to the organic EC device contributes to improving the durability of the device, but may cause the following two problems.

(i) An increase in power consumption.
(ii) A decrease in coloration amount (concentration of the colored organic EC material) in the EC layer.

As a characteristic required of the organic EC device in practical use, the degree of the increase in power consumption or the decrease in coloration amount is desirably within 20%, preferably decreased to within 10%.

(a) Case where Organic EC Material is Anodic Material

In such case, the redox substance is free of electrochemical oxidization at the potential at which the organic EC material starts to be reversibly oxidized.

The above-mentioned requirement is needed in a potential range in which the organic EC material is reversibly oxidized, that is, a potential range in which the reversible oxidation reaction of the organic EC material progresses but the irreversible oxidation reaction of the organic EC material does not progress. In addition, whether or not the redox substance is free of electrochemical oxidization at the potential at which the organic EC material starts to be reversibly oxidized may be evaluated by electrochemical measurement. For example, a solvent in which the redox substance and the organic EC material are allowed to be present in equimolar amounts per number of electrons of a reaction (set to be equal to the actual molar amount when the number of reacted electrons of the reaction is 1, and to be half of the actual molar amount when the number of reacted electrons of the reaction is 2) is subjected to cyclic voltammogram measurement.

In this case, a value of current resulting from the oxidation reaction of the redox substance at the half-wave potential of the oxidation reaction in which the organic EC material is reversibly colored is $1/5$ or less of a value of current resulting from the reaction of the organic EC material in view of practical use of the organic EC device. Part of the potential range in which the organic EC material is reversibly oxidized, the part satisfying the requirement of the value of current, may be said to be the potential range in which the redox substance is substantially free of oxidization described above. In addition, the value of current is preferably $1/10$ or less of a value of current resulting from the reaction of the organic EC material. The conditions described in [1] (a) in this section (requirements regarding redox substance) may be used as conditions of the cyclic voltammogram measurement in this case.

As a main reason why a current resulting from the oxidation reaction of the redox substance flows at the half-wave potential of the oxidation reaction in which the organic EC material is reversibly colored, there is given a small difference between the half-wave potential of the oxidation reaction in which the organic EC material is reversibly colored and the half-wave potential of the redox reaction of the redox substance. From the viewpoint of improving power consumption, it is preferred that the difference between the half-wave potential of the redox reaction of the redox substance and the half-wave potential of the oxidation reaction in which the organic EC material is reversibly colored be large. Specifically, the absolute value of the difference between the half-wave potential of the oxidation reaction of the redox substance and the half-wave potential of the oxidation reaction in which the organic EC material is reversibly colored is preferably more than 40 mV, more preferably more than 60 mV, most preferably more than 200 mV. However, when the difference between those half-wave potentials is excessively large, it may become difficult to satisfy the requirement imposed on the redox substance that the oxidation reaction of the redox substance occurs preferentially to the irreversible oxidation reaction of the organic EC material in terms of potential. Accordingly, there is adopted such a potential difference in half-wave potential as to satisfy the requirement that the oxidation reaction of the redox substance less easily occurs than the reversible oxidation reaction of the organic EC material in terms of potential and more easily occurs than the irreversible oxidation reaction of the organic EC material in terms of potential. It is most preferred for the organic EC device of the present invention to satisfy this requirement.

In addition, in such case, the redox substance is free of electrochemical oxidization at the potential at which the first oxidation reaction of the organic EC material starts to progress.

The above-mentioned requirement is needed in the potential range of the first oxidation reaction of the organic EC material, that is, a potential range in which the first oxidation reaction of the organic EC material progresses but its second oxidation reaction does not progress. In addition, whether or not the redox substance is free of electrochemical oxidization at the potential at which the first oxidation reaction of the organic EC material starts may be evaluated by electrochemical measurement. For example, a solvent in which the redox substance and the organic EC material are allowed to be present in equimolar amounts per number of electrons of a reaction (set to be equal to the actual molar amount when the number of reacted electrons of the reaction is 1, and set to be half of the actual molar amount when the number of reacted electrons of the reaction is 2) is subjected to cyclic voltammogram measurement.

In this case, a value of current resulting from the oxidation reaction of the redox substance at the half-wave potential of the first oxidation reaction which is also a reaction in which the organic EC material is colored is 1/5 or less of a value of current resulting from the reaction of the organic EC material in view of practical use of the organic EC device. Part of the potential range in which the organic EC material is reversibly oxidized, the part satisfying the requirement of the value of current, may be said to be the potential range in which the redox substance is substantially free of oxidization described above. In addition, the value of current is preferably 1/10 or less of the value of current resulting from the reaction of the organic EC material.

As a main reason why a current resulting from the oxidation reaction of the redox substance flows at the half-wave potential of the first oxidation reaction of the organic EC material, there is given a small difference between the half-wave potential of the first oxidation reaction of the organic EC material and the half-wave potential of the oxidation reaction of the redox substance. From the viewpoint of improving power consumption, it is preferred that the difference between the half-wave potential of the oxidation reaction of the redox substance and the half-wave potential of the first oxidation reaction of the organic EC material be large. Specifically, the absolute value of the difference between the half-wave potential of the oxidation reaction of the redox substance and the half-wave potential of the first oxidation reaction of the organic EC material is preferably more than 40 mV, more preferably more than 60 mV, most preferably more than 200 mV. However, when the difference between those half-wave potentials is excessively large, it may become difficult to satisfy the requirement imposed on the redox substance that the oxidation reaction of the redox substance occurs preferentially to the second oxidation reaction of the organic EC material in terms of potential. Accordingly, it is most preferred for the organic EC device of the present invention to have such a potential difference in half-wave potential as to satisfy the requirement that the oxidation reaction of the redox substance less easily occurs than the first oxidation reaction of the organic EC material in terms of potential and more easily occurs than the second oxidation reaction of the organic EC material in terms of potential.

(b) Case where Organic EC Material is Cathodic Material

In such case, the redox substance is free of electrochemical reduction at the potential at which the organic EC material starts to be reversibly reduced.

The above-mentioned requirement is needed in a potential range in which the organic EC material is reversibly reduced, that is, a potential range in which the reversible reduction reaction of the organic EC material progresses but the irreversible reduction reaction of the organic EC material does not progress. In addition, whether or not the redox substance is free of electrochemical reduction may be evaluated by electrochemical measurement. For example, a solvent in which the redox substance and the organic EC material are allowed to be present in equimolar amounts per number of electrons of a reaction (set to be equal to the actual molar amount when the number of reacted electrons of the reaction is 1, and to be half of the actual molar amount when the number of reacted electrons of the reaction is 2) is subjected to cyclic voltammogram measurement.

In this case, a value of current resulting from the reduction reaction of the redox substance at the half-wave potential of the reduction reaction in which the organic EC material is reversibly colored is 1/5 or less of a value of current resulting from the reaction of the organic EC material in view of practical use of the organic EC device. Part of the potential range in which the organic EC material is reversibly reduced, the part satisfying the requirement of the value of current, may be said to be the potential range in which the redox substance is substantially free of reduction described above. In addition, the value of current is preferably 1/10 or less of a value of current resulting from the reaction of the organic EC material. The conditions described in [1] (a) in this section (requirements regarding redox substance) may be used as conditions of the cyclic voltammogram measurement in this case.

As a main reason why a current resulting from the reduction reaction of the redox substance flows at the half-wave potential of the reduction reaction in which the organic EC material is reversibly colored, there is given a small difference between the half-wave potential of the reduction reaction in which the organic EC material is reversibly colored and the half-wave potential of the reduction reaction of the redox substance. From the viewpoint of improving power consumption, it is preferred that the difference between the half-wave potential of the reduction reaction of the redox substance and the half-wave potential of the reduction reaction in which the organic EC material is reversibly colored be large. Specifically, the absolute value of the difference between the half-wave potential of the reduction reaction of the redox substance and the half-wave potential of the reduction reaction in which the organic EC material is reversibly colored is preferably more than 40 mV, more preferably more than 60 mV, most preferably more than 200 mV. However, when the difference between those half-wave potentials is excessively large, it may become difficult to satisfy the requirement imposed on the redox substance that the reduction reaction of the redox substance occurs preferentially to the irreversible reduction reaction of the organic EC material in terms of potential. Accordingly, there is adopted such a potential difference in half-wave potential as to satisfy the requirement that the reduction reaction of the redox substance less easily occurs than the reversible reduction reaction of the organic EC material in terms of potential and more easily occurs than the irreversible reduction reaction of the organic EC material in terms of potential. It is most preferred for the organic EC device of the present invention to satisfy this requirement.

In addition, in such case, the redox substance is free of electrochemical reduction at the potential at which the first reduction reaction of the organic EC material starts to progress.

The above-mentioned requirement is needed in the potential range of the first reduction reaction of the organic EC material, that is, a potential range in which the first reduction reaction of the organic EC material progresses but its second reduction reaction does not progress. In addition, whether or not the redox substance is free of electrochemical reduction at the potential at which the first reduction reaction of the organic EC material starts to occur may be evaluated by electrochemical measurement. For example, a solvent in which the redox substance and the organic EC material are allowed to be present in equimolar amounts per number of electrons of a reaction (set to be equal to the actual molar amount when the number of reacted electrons of the reaction is 1, and set to be half of the actual molar amount when the number of reacted electrons of the reaction is 2) is subjected to cyclic voltammogram measurement.

In this case, a value of current resulting from the reduction reaction of the redox substance at the half-wave potential of the first reduction reaction which is also a reaction in which the organic EC material is colored is ⅕ or less of a value of current resulting from the reaction of the organic EC material in view of practical use of the organic EC device. Part of the potential range in which the organic EC material is reversibly reduced, the part satisfying the requirement of the value of current, may be said to be the potential range in which the redox substance is substantially free of reduction described above. In addition, the value of current is preferably 1/10 or less of the value of current resulting from the reaction of the organic EC material.

As a main reason why a current resulting from the reduction reaction of the redox substance flows at the half-wave potential of the first reduction reaction of the organic EC material, there is given a small difference between the half-wave potential of the first reduction reaction of the organic EC material and the half-wave potential of the reduction reaction of the redox substance. From the viewpoint of improving power consumption, it is preferred that the difference between the half-wave potential of the reduction reaction of the redox substance and the half-wave potential of the first reduction reaction of the organic EC material be large. Specifically, the absolute value of the difference between the half-wave potential of the reduction reaction of the redox substance and the half-wave potential of the first reduction reaction of the organic EC material is preferably more than 40 mV, more preferably more than 60 mV, most preferably more than 200 mV. However, when the difference between those half-wave potentials is excessively large, it may become difficult to satisfy the requirement imposed on the redox substance that the reduction reaction of the redox substance occurs preferentially to the second reduction reaction of the organic EC material in terms of potential. Accordingly, it is most preferred for the organic EC device of the present invention to have such a potential difference in half-wave potential as to satisfy the requirement that the reduction reaction of the redox substance less easily occurs than the first reduction reaction of the organic EC material in terms of potential and more easily occurs than the second reduction reaction of the organic EC material in terms of potential.

(c) Case where EC Layer Contains Anodic Organic EC Material and Cathodic Organic EC Material In the present invention, when a plurality of kinds of the organic EC materials are contained in the EC layer, a plurality of kinds (at least two kinds) of the redox substances are contained in the EC layer correspondingly to the kinds of the organic EC materials.

In such case, the redox substance corresponding to the anodic organic EC material is free of electrochemical oxidization at the potential at which the reversible oxidation reaction of the anodic organic EC material or the first oxidation reaction of the anodic organic EC material starts.

Meanwhile, the redox substance corresponding to the cathodic organic EC material is free of electrochemical reduction at the potential at which the reversible reduction reaction of the cathodic organic EC material or the first reduction reaction of the cathodic organic EC material starts.

As described above, in the organic EC device containing both the anodic organic EC material and the cathodic organic EC material in the EC layer, the redox substances corresponding to the respective organic EC materials are used. With this, the irreversible oxidation (or reduction) reaction or the second oxidation (or reduction) reaction of each organic EC material can be effectively prevented. It should be noted that a relationship among their potential ranges may be considered in the same manner as in the case of (a) or (b).

[4] Amount of Redox Substance

In the present invention, with regard to the amount of the redox substance contained in the EC layer included in the organic EC device, the following formula (A) is preferably satisfied.

$$R/S \geq 0.2 \quad (A)$$

(R: a molar amount per number of electrons of a reaction of the redox substance in the EC layer, S: a molar amount per number of electrons of a reaction of the organic EC material with reference to the redox substance)

It should be noted that the phrase "with reference to the redox substance" means that a molar amount (R) per number of electrons of the reaction of the redox substance is used as a reference. In the present invention, the redox substance is used to protect the organic EC material within the range of a charge amount involved in the oxidation (or reduction) reaction of the redox substance corresponding to the organic EC material of interest. Accordingly, when the amount of the redox substance contained in the EC layer included in the organic EC device is small, the protection of the organic EC material may become insufficient. In view of this, the amount of the redox substance is preferably ⅕ (0.2) or more of the organic EC material in terms of molar amount ratio per number of electrons of a reaction. The amount of the redox substance is more preferably ½ or more of the organic EC material, most preferably 1 or more of the organic EC material. It should be noted that when the R/S value is 1 or more, the charge amount involved in the oxidation (or reduction) reaction of the redox substance exceeds the charge amount involved in the oxidation (or reduction) reaction of the organic EC material. This is preferred because the progress of the oxidation (or reduction) reaction of the redox substance in a potential region outside the potential region in which the organic EC material is preferably used may be estimated based on a charge amount (value of current). It should be noted that the upper limit of the R/S value is not determined by a relationship with the organic EC material, but is determined in consideration of, for example, an increase in viscosity of the solution caused by an increase in amount of the redox substance contained in the EC layer, a decrease in the response speed of the device caused by the increase in viscosity of the solution, and a decrease in the device transmittance caused by the light absorption of the redox substance.

[Effect of Incorporation of Redox Substance into EC Layer]

Next, the effect of the incorporation of the redox substance satisfying the predetermined requirements into the EC layer in the present invention is described with equations. It should be noted that the following description applies to the case where the organic EC material is a material having an anodic or cathodic characteristic, and the case where the EC layer contains an anodic organic EC material and a cathodic organic EC material.

The case where the reactions of the organic EC material include a first oxidation (or reduction) reaction and a second oxidation (or reduction) reaction which less easily progresses than the first oxidation (or reduction) reaction in terms of potential is discussed. It should be noted that in this case, the first oxidation (or reduction) reaction is assumed to be a reaction which causes a color change of the organic EC material to be used in the coloring/bleaching of the organic EC device.

The case where the organic EC material undergoes a two-step oxidation (or reduction) reaction, i.e., a first oxidation (or reduction) reaction and a second oxidation (or reduction) reaction which less easily progresses than the first oxidation (or reduction) reaction in terms of potential is discussed. It should be noted that in this case, the first oxidation (or reduction) reaction is assumed to be a reaction which causes a color change of the organic EC material to be used in the coloring/bleaching of the organic EC device.

In this case, the first oxidation (or reduction) reaction of the organic EC material requires lower energy for the progress of the reaction as compared to the second oxidation (or reduction) reaction, and hence a side reaction, such as the deterioration of the organic EC material, hardly occurs. As a result, when undergoing a cycle of oxidation/reduction (or reduction/oxidation), the deterioration ratio of the organic EC material is small. It should be noted that there is a system which may be said to be substantially free of deterioration (have a deterioration ratio of substantially zero) in some situations of the driving of the organic EC device. In contrast, for the opposite reason, in the second oxidation (or reduction) reaction, the organic EC material has a relatively large deterioration ratio when undergoing a cycle of oxidation/reduction (or reduction/oxidation). Basically, the organic EC material is hardly deteriorated through the first oxidation (or reduction) reaction and is deteriorated through a higher oxidation (or reduction) reaction, such as the second oxidation (or reduction) reaction, in many cases. In such cases, when a redox substance which satisfies predetermined requirements is used as in the present invention, the deterioration of the organic EC material can be prevented during the driving of the organic EC device.

Now, with regard to the first oxidation (or reduction) reaction of the organic EC material, the ratio of organic EC material deactivated through deterioration when undergoing 1 cycle of oxidation/reduction (or reduction/oxidation) is represented by $P_1$. In addition, similarly, with regard to the second oxidation (or reduction) reaction, the ratio of the organic EC material deactivated through deterioration when undergoing 1 cycle of oxidation/reduction (or reduction/oxidation) is represented by $P_2$.

In this connection, with regard to the reversibility or irreversibility of the oxidation (or reduction) reactions of the organic EC material, the oxidation (or reduction) reaction in which the organic EC material is reversibly colored/bleached may be said to be a first oxidation (or reduction) reaction. On the other hand, the irreversible oxidation (or reduction) reaction of the organic EC material may be said to be a second oxidation (or reduction) reaction. In this case, the ratio $P_2$ of the organic EC material deactivated through deterioration caused by the second oxidation (or reduction) reaction is generally high, and specifically, the value of $P_2$ is 1 or close to 1.

In addition, in this case, in a complementary organic EC device, the case of introducing redox substances respectively correspondingly to both reactions, i.e., the oxidation reaction and the reduction reaction of the organic EC material may be considered in the following manner. In the complementary-type cell, charge amounts to be used in the oxidation reaction and the reduction reaction are uniform (the same number of electrons as electrons recovered by the electrode through the oxidation reaction are used in the reduction reaction), and hence the charge amount to be used in the device as a whole is limited by the reaction having the smaller charge amount which can be input or output through the reaction, out of the oxidation reaction and the reduction reaction. Accordingly, in this case, when $P_1$ of the anodic organic EC material is represented by $P_{1A}$ and $P_1$ of the cathodic organic EC material is represented by $P_{1C}$, $P_1$ in the device as a whole may be considered to be equal to the smaller of $P_{1A}$ and $P_{1C}$. The case of determining $P_2$ in the device as a whole may be considered similarly.

Now, the amount of the organic EC material before the initiation of cycles is defined as 1, and the case where a charge corresponding to the whole amount of coloring/bleaching-active organic EC material in the initial state flows (case where a charge flows until all the organic EC material is brought into a coloring/bleaching-active state) in each cycle is assumed. In this case, the amount of the organic EC material subjected to each redox reaction and the amount of the organic EC material deactivated through each redox reaction in each cycle are as shown in Table 1 below.

TABLE 1

| $n^{(Note\ 1)}$ | $H_n^{(Note\ 2)}$ | $I_n^{(Note\ 3)}$ | $J_n^{(Note\ 4)}$ | $K_n^{(Note\ 5)}$ |
|---|---|---|---|---|
| 0 | — | — | — | 1 |
| 1 | $P_1$ | 0 | 0 | $1 - P_1$ |
| 2 | $P_1(1 - P_1)$ | $P_1^2$ | $P_1^2 P_2$ | $P_1^2 - P_1^2 P_2 - 2P_1 + 1$ |
| n | $K_{n-1} P_1$ | $1 - K_{n-1} - H_n$ | $I_n P_2$ | $K_{n-1}(P_1 P_2 - P_1 + P_2 + 1) - P_2$ |

$^{(Note\ 1)}$n: number of cycles
$^{(Note\ 2)}$$H_n$: amount of organic EC material deactivated through first redox reaction
$^{(Note\ 3)}$$I_n$: amount of organic EC material subjected to second redox reaction
$^{(Note\ 4)}$$J_n$: amount of organic EC material deactivated through second redox reaction
$^{(Note\ 5)}$$K_n$: amount of active organic EC material to be subjected to next cycle Based on Table 1, the amount ($K_n$) of the active organic EC material remaining at the completion of n cycles is determined by the following equation (1).

$$K_n = P_1(P_2 - P_2 P_2 - 1)\{(P_2 P_2 - P_2 + P_2 + 1)^{n-1} - 1\}/(P_2 P_2 - P_2 + P_2) + 1 - P_2 \qquad (1)$$

In the present invention, the oxidation (or reduction) reaction of the redox substance more easily occurs in terms of potential than the second oxidation (or reduction) reaction of the organic EC material, and hence $K_n$ within the range of the charge amount of the redox substance is a particular solution at $P_2 = 0$ in the above-mentioned equation. In the case of $P_2 = 0$ in the equation (1), $K_n$ is specifically as represented by the following equation (1').

$$\begin{aligned} K_n &= P_1(P_1 - 1)\{(-P_1 + 1)^{n-1} - 1\}/(-P_1) + 1 \qquad (1') \\ &= (1 - P_1)\{(1 - P_1)^{n-1} - 1\} + 1 \\ &= (1 - P_1)^n + P_1 \end{aligned}$$

Figure 4:
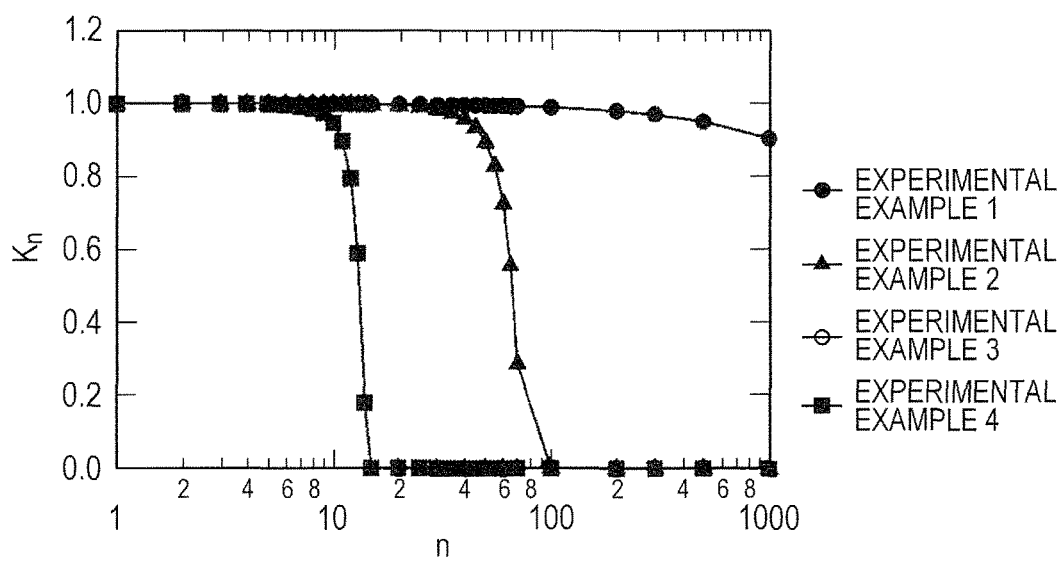
FIG. 4 is a graph for showing the amount ($K_n$ value) of an active organic EC material against the number n of cycles of a redox reaction.

In order to clarify the meaning of the equation, a simulation using parameters shown in Table 2 below is performed. FIG. 4 is a graph for showing the amount ($K_n$ value) of the active organic EC material against the number n of cycles of the redox reaction. It should be noted that in the simulation, it is supposed that the redox substance is present in an excess amount.

TABLE 2

| | $P_1$ | $P_2$ | Remark |
|---|---|---|---|
| Experimental Example 1 | 0.0001 | 0.1 | System using redox substance (legend ● in FIG. 4) |
| Experimental Example 2 | 0.0001 | 0.1 | Second oxidation (or reduction) reaction system (legend ▲ in FIG. 4) |
| Experimental Example 3 | 0.0001 | 1 | System using redox substance (legend ○ in FIG. 4) |
| Experimental Example 4 | 0.0001 | 1 | Irreversible oxidation (or reduction) reaction system (legend ■ in FIG. 4) |

From FIG. 4, it was confirmed that the system using the redox substance (Experimental Example 1 and Experimental Example 3) was effective for the maintenance of the $K_n$ value for each of the system of the first oxidation (or reduction) reaction and the second oxidation (or reduction) reaction and the system of irreversible oxidation (or reduction). It should be noted that in FIG. 4, the plot for showing the results of Experimental Example 3 (○) is not visible, but in fact, is overlapped by the plot for showing the results of Experimental Example 1 (●).

The following (A1) and (A2) can be confirmed from the simulation.

(A1) When a redox substance whose oxidation reaction less easily occurs than the oxidation reaction in which the organic EC material is reversibly colored in terms of potential, whose oxidation reaction more easily occurs than the irreversible oxidation reaction of the organic EC material in terms of potential, and whose reaction is reversible is used, the deterioration of the organic EC material or the organic EC device can be suppressed.

(A2) When a redox substance whose reduction reaction less easily occurs than the reduction reaction in which the organic EC material is reversibly colored in terms of potential, whose reduction reaction more easily occurs than the irreversible reduction reaction of the organic EC material in terms of potential, and whose reaction is reversible is used, the deterioration of the organic EC material or the organic EC device can be suppressed.

Therefore, the introduction of a redox substance which satisfies any one of the following two requirements can suppress the deterioration of the organic EC material or the organic EC device.

(ai) Its oxidation reaction less easily occurs than the oxidation reaction in which the organic EC material is reversibly colored in terms of potential, its oxidation reaction more easily occurs than the irreversible oxidation reaction of the organic EC material in terms of potential, and its reaction is reversible.

(aii) Its reduction reaction less easily occurs than the reduction reaction in which the organic EC material is reversibly colored in terms of potential, its reduction reaction more easily occurs than the irreversible reduction reaction of the organic EC material in terms of potential, and its reaction is reversible.

In addition, the following (B1) and (B2) can be confirmed from the simulation.

(B1) When a redox substance whose oxidation reaction less easily occurs than the first oxidation reaction of the organic EC material in terms of potential, whose oxidation reaction more easily occurs than the second oxidation reaction of the organic EC material in terms of potential, and whose reaction is reversible is used, the deterioration of the organic EC material or the organic EC device can be suppressed.

(B2) When a redox substance whose reduction reaction less easily occurs than the first reduction reaction of the organic EC material in terms of potential, whose reduction reaction more easily occurs than the second reduction reaction of the organic EC material in terms of potential, and whose reaction is reversible is used, the deterioration of the organic EC material or the organic EC device can be suppressed.

Therefore, the introduction of a redox substance which satisfies any one of the following two requirements can suppress the deterioration of the organic EC material or the organic EC device.

(bi) Its oxidation reaction less easily occurs than the first oxidation reaction of the organic EC material in terms of potential, its oxidation reaction more easily occurs than the second oxidation reaction of the organic EC material in terms of potential, and its reaction is reversible.

(bii) Its reduction reaction less easily occurs than the first reduction reaction of the organic EC material in terms of potential, its reduction reaction more easily occurs than the second reduction reaction of the organic EC material in terms of potential, and its reaction is reversible.

Figure 5:
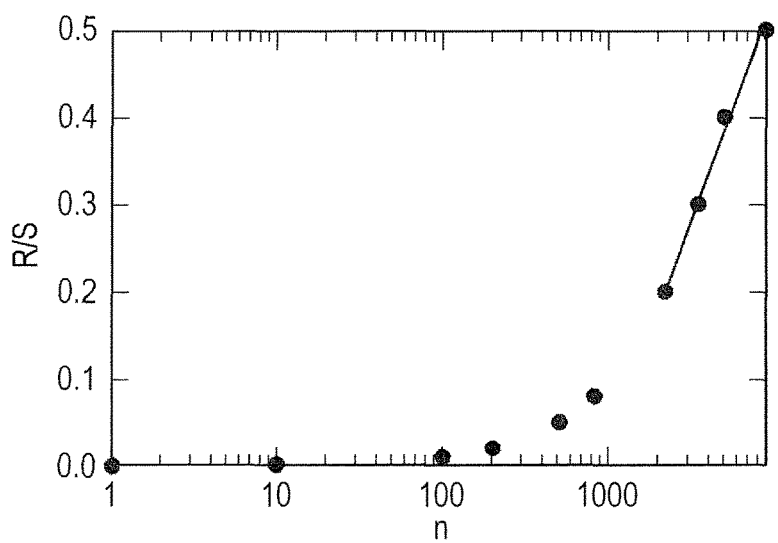
FIG. 5 is a graph for showing a relationship between the number n of cycles and the amount of a redox substance.

In addition, in order to clarify the effect of the introduction of the redox substance, a relationship between the number of cycles at which the protective effect of the redox substance on the organic EC material starts to disappear, and the amount of the redox substance was investigated. Through the investigation of the relationship, conditions under which the second oxidation (or reduction) reaction of the organic EC material starts by overcoming the amount of presence of the redox substance are clarified. FIG. 5 is a graph for showing a relationship between the number n of cycles and the amount of the redox substance. It should be noted that in FIG. 5, the amount of the redox substance is represented by an R/S value.

From FIG. 5, it is found that when R/S is 0.2 or more, the number n of cycles exceeds 2,000. From this result, it is found that when the redox substance is introduced so that R/S is 0.2 or more, the organic EC material is effectively protected by the redox substance.

Meanwhile, in the organic EC device of the present invention, the degree of the increase in power consumption caused by the use of the redox substance is desirably within 20%, preferably decreased to within 10%.

The reason is described below. That is, when part of a charge amount to be used in the oxidation (or reduction) reaction of the organic EC material is used for the oxidation (or reduction) reaction of the redox substance, an increase in power consumption caused by the use of the redox reaction occurs. The degree of the increase is proportional to the value of current or charge amount used. That is, in order to suppress the degree of the increase in power consumption to the desired range, it is desirable that the value of current or charge amount to be used in the oxidation (or reduction) reaction of the redox substance be ⅕ or less, preferably ¹/₁₀ or less with respect to the current or charge amount to be used in the oxidation (or reduction) reaction of the organic EC material.

In the present invention, a mode in which the EC material is dissolved in a solvent is preferably used. The ON/OFF contrast of the device based on the coloring/bleaching of the EC material increases along with an increase in amount of the EC material. When the EC material is fixed to an electrode, the amount of the EC material to be colored/bleached is determined by an electrode area and an adsorption density. In contrast, when the EC material is dissolved in the solvent, the amount is determined by the concentration of the EC material and the interelectrode distance. The latter has a higher degree of freedom in terms of exhibiting a higher coloring/bleaching contrast, and hence the mode in which the EC material is dissolved in the solvent is preferably used.

From a different viewpoint, the present invention may be said to be an invention for suppressing the color change of an EC device. The present invention is an invention in which the EC material is prevented from entry into a relatively unstable state beyond the normal colored state of the EC material. Herein, the normal colored state generally refers to a first oxidation state in the case of the anodic EC material, and generally refers to a first reduction state in the case of the cathodic EC material. In addition, the relatively unstable state beyond the normal colored state refers to a higher oxidation state, such as a second oxidation state, in the case of the anodic EC material, and refers to a higher reduction state, such as a second reduction state, in the case of the cathodic EC material. The EC material in such higher oxidation or reduction state has an electron state different from a normal state, and hence absorbs light having a different wavelength from that in the case of the normal colored state. Accordingly, the present invention, which is an invention in which the entry into the relatively unstable state beyond the normal colored state of the EC material is prevented, may be said to be an invention for suppressing the color change of the EC device by keeping the normal colored state of the EC material.

[Applications of Organic EC Device]

The organic EC device of the present invention in a state of not being colored (bleached state) exhibits high transparency, and hence can sufficiently transmit incident light. In addition, the organic EC device of the present invention in a state of being colored (colored state) reliably blocks out at least part of incident light and allows the extraction of light whose optical characteristics have been modulated.

The organic EC device of the present invention may be used as a constituent member of an optical filter, a lens unit, an imaging apparatus, or a window member.

An optical filter of the present invention includes the organic EC device of the present invention, and an active device to be electrically connected to the organic EC device. Specific examples of the active device to be electrically connected to the organic EC device include a switching device for controlling the transmittance of the organic EC device, and an amplifying device. Examples of the switching device include a TFT device and a MIM device. In this connection, the TFT device is also called a thin-film transistor, and a semiconductor or an oxide semiconductor is used as its constituent material.

A lens unit of the present invention includes a plurality of lenses, and an optical filter including the organic EC device of the present invention. The optical filter included in the lens unit may be arranged between the plurality of lenses, or may be arranged on the outside of the lenses. The optical filter is preferably arranged on the optical axis of the lenses.

An imaging apparatus of the present invention includes an optical filter, and a light-receiving device configured to receive light which has passed through the optical filter.

Specific examples of the imaging apparatus include a camera, a video camera, and a mobile phone with a camera. The mode of the imaging apparatus may be such that a main body including the light-receiving device and a lens unit including a lens are separable from each other.

Herein, in the case where the imaging apparatus is separable into the main body and the lens unit, a mode in which an optical filter separate from the imaging apparatus is used in image pickup is also encompassed in the present invention. It should be noted that in such case, the optical filter is arranged, for example, on the outside of the lens unit, between the lens unit and the light-receiving device, or between a plurality of lenses (in the case where the lens unit includes a plurality of lenses).

When the organic EC device of the present invention is used as a constituent member of the imaging apparatus, for example, the arrangement of the organic EC device of the present invention in the optical path of an image pickup optical system leading to an imaging device allows the control of the amount of light to be received by the imaging device or the wavelength distribution characteristic of incident light. This image pickup optical system may also be called a lens system. An example of the image pickup optical system is a lens unit including a plurality of lenses.

In addition, when the organic EC device of the present invention is used as a constituent member of the imaging apparatus, the position at which the organic EC device of the present invention is arranged is not particularly limited. For example, the organic EC device may be arranged in front of the image pickup optical system, may be arranged between lenses included in the image pickup optical system, or may be arranged immediately before the imaging device.

Figure 10A:
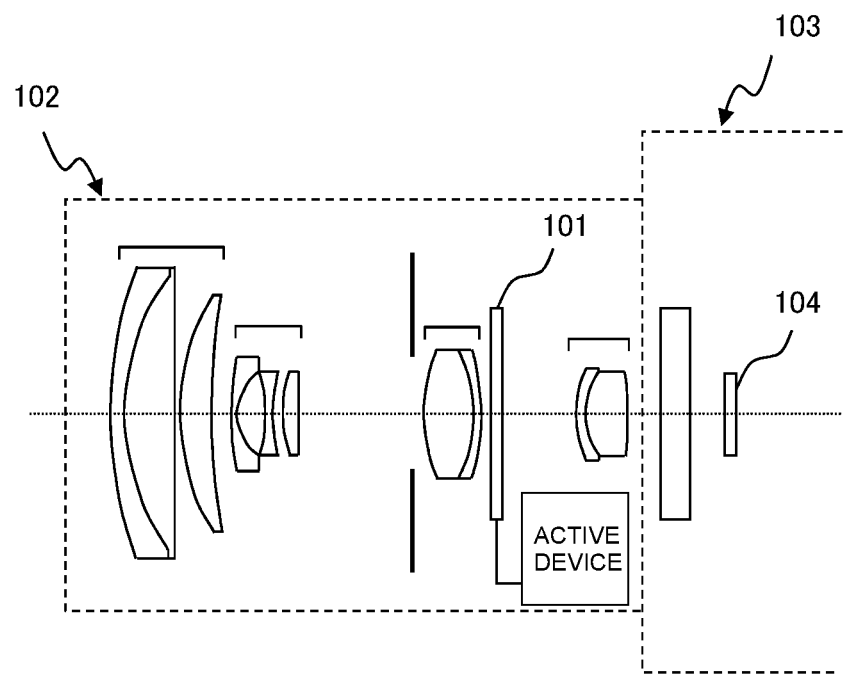
FIGS. 10A and 10B are schematic views for illustrating examples of an image pickup optical system that includes an organic EC device.
Figure 10B:
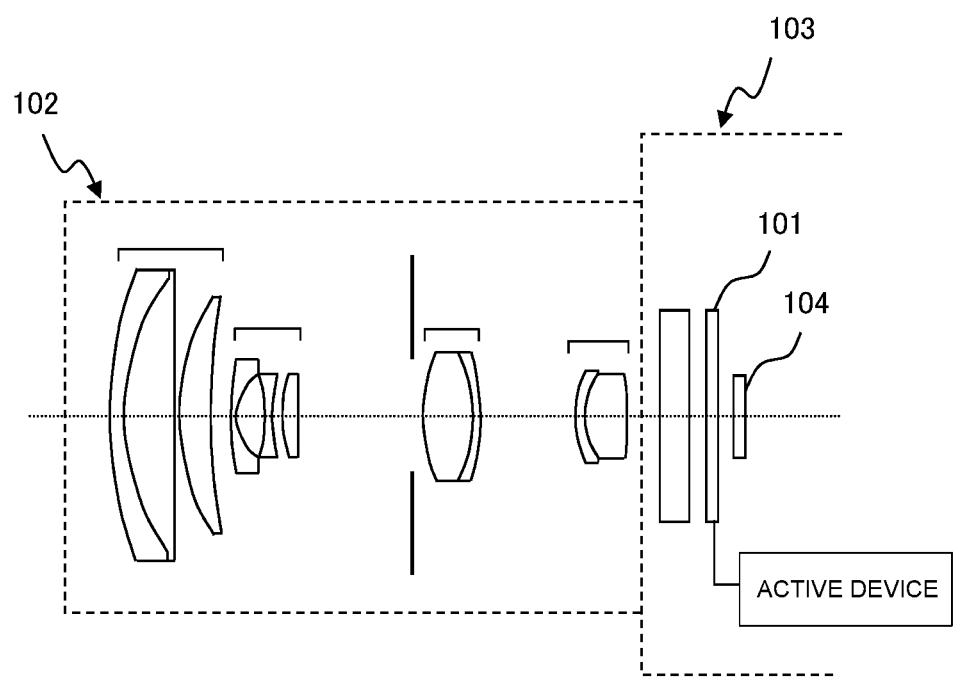

FIGS. 10A and 10B illustrate examples of an image pickup optical system that includes the organic EC device of the present invention. The organic EC device in FIGS. 10A and 10B is denoted by 101, the lens unit is denoted by 102, the imaging apparatus is denoted by 103, and the imaging device is denoted by 104.

A window member of the present invention includes a pair of transparent substrates, an organic EC device arranged between the transparent substrates, and an active device for controlling the transmittance of the organic EC device. The active device is connected to the organic EC device, and its mode of connection to the organic EC device may be a directly connected mode, or may be an indirectly connected mode. The window member of the present invention may be used for a window of, for example, an aircraft, an automobile, or a house. In addition, the window member including the organic EC device may also be called a window member including an electronic curtain.

Figure 11:
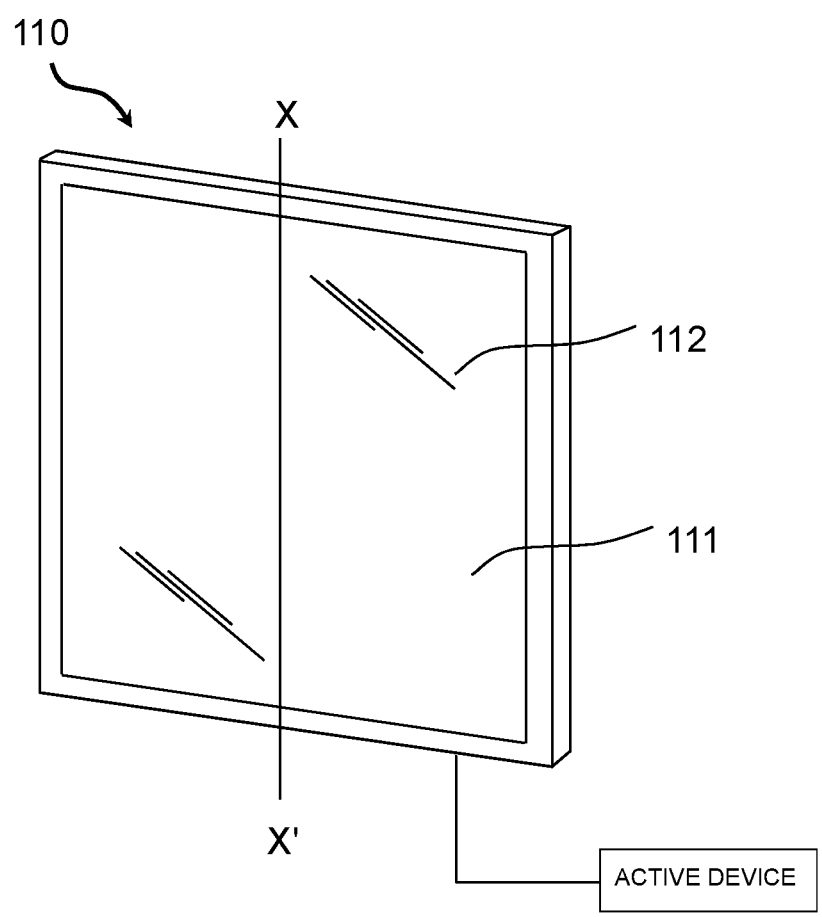
FIG. 11 is a schematic view for illustrating an example of a window member that includes an organic EC device.

FIG. 11 illustrates an example of a window member that includes the organic EC device of the present invention. The organic EC device in FIG. 11 is denoted by 111, the window member is denoted by 110, and the transparent substrate is denoted by 112. A cross-section along the line X-X' may be, for instance, as illustrated in FIG. 1 (shown without the active device).

EXAMPLES

The present invention is more specifically described below by way of Examples. However, the present invention is not limited thereto.

[Measurement and Evaluation of Organic EC Material and Redox Substance]

Through electrochemical measurement, the reversibility of each of an organic EC material and a redox substance was measured and evaluated.

First, the following materials and solvent were mixed to prepare solutions.

(1) Solution A for Measurement

A solution of 0.1 M tetrabutylammonium hexafluorophosphate in propylene carbonate (PC), and 5,10-dimethyl-5,10-dihydrophenazine (hereinafter sometimes referred to as DMDHP; organic EC material) were mixed to prepare a solution having a concentration of 1 mM.

(2) Solution B for Measurement

A solution of 0.1 M tetrabutylammonium hexafluorophosphate in propylene carbonate (PC), and ferrocene (not a ferrocenium ion, which is an oxidized form, but ferrocene, which is a reduced form, redox substance) were mixed to prepare a solution having a concentration of 1 mM.

Next, each solution for measurement was subjected to nitrogen gas bubbling to remove dissolved oxygen. It should be noted that the numbers of reacted electrons of the solutes (organic EC material and redox substance) contained in each measurement solution are both 1. Next, the previously prepared solution for measurement was introduced into a measurement cell including a planar glassy carbon electrode having a diameter of 3 mm (working electrode), a platinum electrode (counter electrode), and a silver electrode (Ag/Ag$^+$ (PF$_6$, PC), reference electrode). Next, the temperature of the solution was set to 25° C., and a 100-cycle cyclic voltammogram was measured at a scanning rate of 100 mVs$^{-1}$.

In the measurement for the solution A for measurement, DMDHP was observed to exhibit a redox wave corresponding to a first oxidation reaction, which appeared at a half-wave potential of −0.37 V, and a current corresponding to a second oxidation reaction, which rose from 0.10 V. Meanwhile, in the measurement for the solution B for measurement, ferrocene exhibited a redox wave corresponding to an oxidation reaction of ferrocene at a half-wave potential of −0.59 V. In addition, in the cyclic voltammogram of ferrocene, a current value resulting from the oxidation of Compound 2 at −0.59 V was 1.0×10$^{-8}$ A. It should be noted that this value was smaller by three orders of magnitude or more as compared to a current value (5.4×10$^{-5}$ A) resulting from the first oxidation reaction of DMDHP at the same potential. As the scanning range of the solution A for measurement, the range of from −1.2 V to −0.2 V was selected in the case of causing DMDHP to undergo only the first oxidation reaction, and the range of from −1.2 V to −1.0 V was selected in the case of causing DMDHP to undergo the second oxidation reaction. On the other hand, the range of from −1.0 V to 0.2 V was selected as the scanning range of the solution B for measurement.

The peak value of current of the first oxidation reaction in the 100th cycle in the cyclic voltammogram of this experimental example when the peak value of current of the same reaction in the 10th cycle is defined as 1 is shown in Table 3 below. In addition, for ferrocene, the oxidation peak value of current of the redox wave at a half-wave potential of −0.37 V in the 100th cycle when the peak value of current in the 10th cycle is defined as 1 is shown in Table 3 below.

TABLE 3

|  | 100th cycle |
| --- | --- |
| DMDHP (first oxidation reaction) | 0.99 |
| DMDHP (first oxidation reaction, second oxidation reaction) | 0.92 |
| Ferrocene | 0.98 |

From Table 3, it was found that the amount of active DMDHP was decreased by causing DMDHP to undergo the second oxidation (irreversible oxidation) as compared to the case of causing DMDHP to undergo only the first oxidation (reversible oxidation). In addition, in contrast, it was found that the decrease amount of the peak current when the number of measurement cycles was increased in the oxidation-reduction of ferrocene was small as compared to DMDHP having undergone the second oxidation.

[Simulation Regarding Organic EC Material]

Next, the simulation results of the profile of the organic EC device are described below. Parameters used in this simulation are shown in Table 4 below.

TABLE 4

|  | $P_1$ | $P_2$ |
| --- | --- | --- |
| DMDHP | 0.000112 | 0.000926 |

In Table 4, the $P_1$ value and the $P_2$ value are each a decrease ratio per cycle calculated from the decrease amount of active DMDHP during the period from the 10th cycle to the 100th cycle shown in Table 3. Those values ($P_1$, $P_2$) may differ from actual values in terms of absolute values from the viewpoint of the effect of the present invention (improvement of the cycle durability of the organic EC device), but are considered to exhibit a correct tendency.

Figure 6:
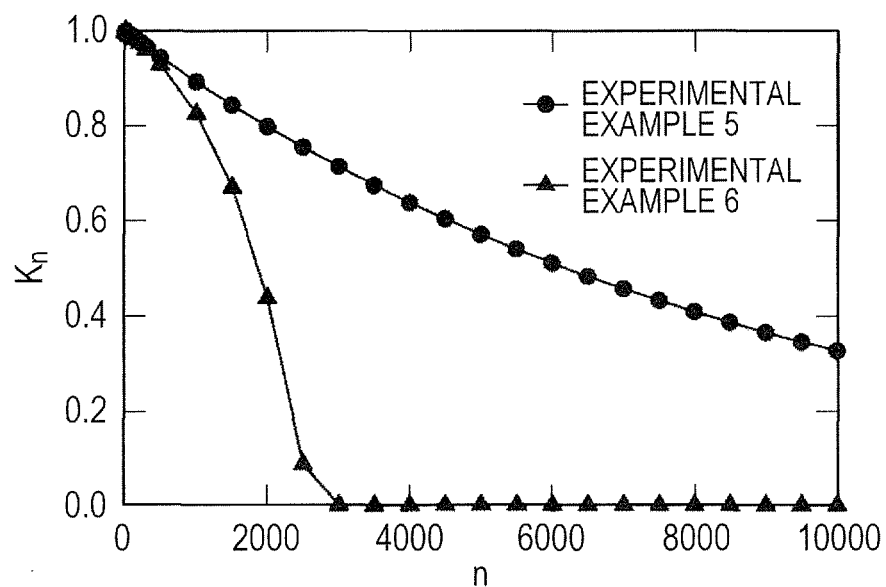
FIG. 6 is a graph for showing a relationship between the number of redox cycles of an organic EC material and the amount of an active organic EC material.

Using those values, cycle characteristics in the case where the amount of ferrocene (redox substance) is set to be equal to that of DMDHP and the case where no redox substance is used are shown in FIG. 6. FIG. 6 is a graph for showing a relationship between the number of redox cycles and the amount of the active EC material in each of Experimental Examples 5 and 6. Here, Experimental Example 5 is an experimental example using ferrocene (redox substance) in addition to DMDHP (organic EC material). In addition, Experimental Example 6 is an experimental example in the case of using only DMDHP (EC material).

From FIG. 6, it was able to be confirmed from the viewpoint of a redox potential that when a redox substance (ferrocene) having the following features was used, the cycle characteristic of the organic EC device was improved.

The oxidation potential of the redox substance is present between the first oxidation potential (reversible oxidation) and the second oxidation potential (irreversible oxidation) of the organic EC material. That is, the following relationship is satisfied: first oxidation potential<oxidation potential of redox substance<second oxidation potential.

The redox substance is oxidized after the first oxidation of the organic EC material, and hence the redox substance does not inhibit the first oxidation of the organic EC material. On the other hand, the second oxidation of the organic EC material occurs after the oxidation of the redox substance, and hence the second oxidation of the organic EC material is inhibited by the redox substance.

In addition, based on the cyclic voltammogram measurement of the organic EC material (DMDHP), it was able to be confirmed that when a redox substance having a half-wave potential of the reversible oxidation reaction between the half-wave potential of the first oxidation reaction and the half-wave potential of the second oxidation reaction was used, the cycle characteristic of the organic EC device was improved.

[Example 1] Production of Organic Electrochromic Device

The organic EC device 1 illustrated in FIG. 1 was produced by a method described below.

Two substrates with a transparent electrode in each of which a fluorine-doped tin oxide (FTO) thin film having a thickness of 200 nm was formed on a glass substrate having a thickness of 1.1 mm were prepared. In this case, the FTO transparent electrode had a visible light average transmittance of 85% and a sheet resistance of 40 ohms per square (Ω/□).

Next, a tin oxide nanoparticle slurry having an average particle diameter of 21 nm and a zinc oxide nanoparticle slurry having an average particle diameter of 34 nm were mixed so that the volume ratio between tin oxide and zinc oxide was 2:1, to thereby prepare a mixed slurry. Then, for one of the previously prepared substrates with a transparent electrode, the mixed slurry was applied onto the FTO transparent electrode of the substrate, to thereby form a coating film. Next, the coating film was baked at 500° C. for 30 minutes, and then only zinc oxide was etched with dilute hydrochloric acid to provide a porous tin oxide nanoparticle film. In this case, the porous tin oxide nanoparticle film had a thickness of about 5.0 μm. It should be noted that in the following description, the substrate with a transparent electrode whose outermost surface is the FTO transparent electrode (first electrode 11a) is referred to as "first substrate 10a", and the substrate with a transparent electrode whose outermost surface is the porous tin oxide nanoparticle film (second electrode 11b) is referred to as "second substrate 10b".

Next, the first substrate 10a and the second substrate 10b were arranged so that their conductive surfaces (surfaces having arranged thereon the electrodes) were opposed to each other and the substrates had a constant distance therebetween. Then, the two substrates (10a, 10b) were bonded using an epoxy resin in such a manner that an opening for the injection of the solution for filling the EC layer 12 was left. Thus, a cell for an organic EC device was produced. At this time, the interelectrode distance was adjusted by forming the sealing material 13 through the use of films or beads having different thicknesses as spacers. It should be noted that in the device to be produced, the FTO transparent electrode (first electrode 11a) functions as a working electrode.

Next, an organic EC material (DMDHP), a redox substance (ferrocene), and a supporting electrolyte (mixed solution of 0.1 M tetrabutylammonium hexafluorophosphate and propylene carbonate) were mixed to prepare an EC composition.

Next, the previously prepared cell for an organic EC device was filled with the EC composition through the opening of the cell by a vacuum injection method to form the EC layer 12. Further, the opening of the cell was sealed with an epoxy resin. Thus, the organic EC device 1 was produced.

Now, an example of the case where the redox substance is an EC material is described. Both the organic EC material and the redox substance are EC materials, and hence the organic EC material is referred to as "first EC material" and the redox substance is referred to as "second EC material".

[Synthesis Example 1] Synthesis of Compound 1

A synthesis example of Compound 1 serving as the first EC material is described below.

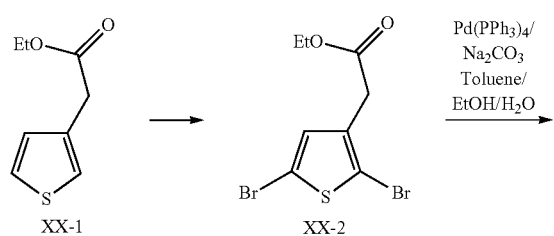

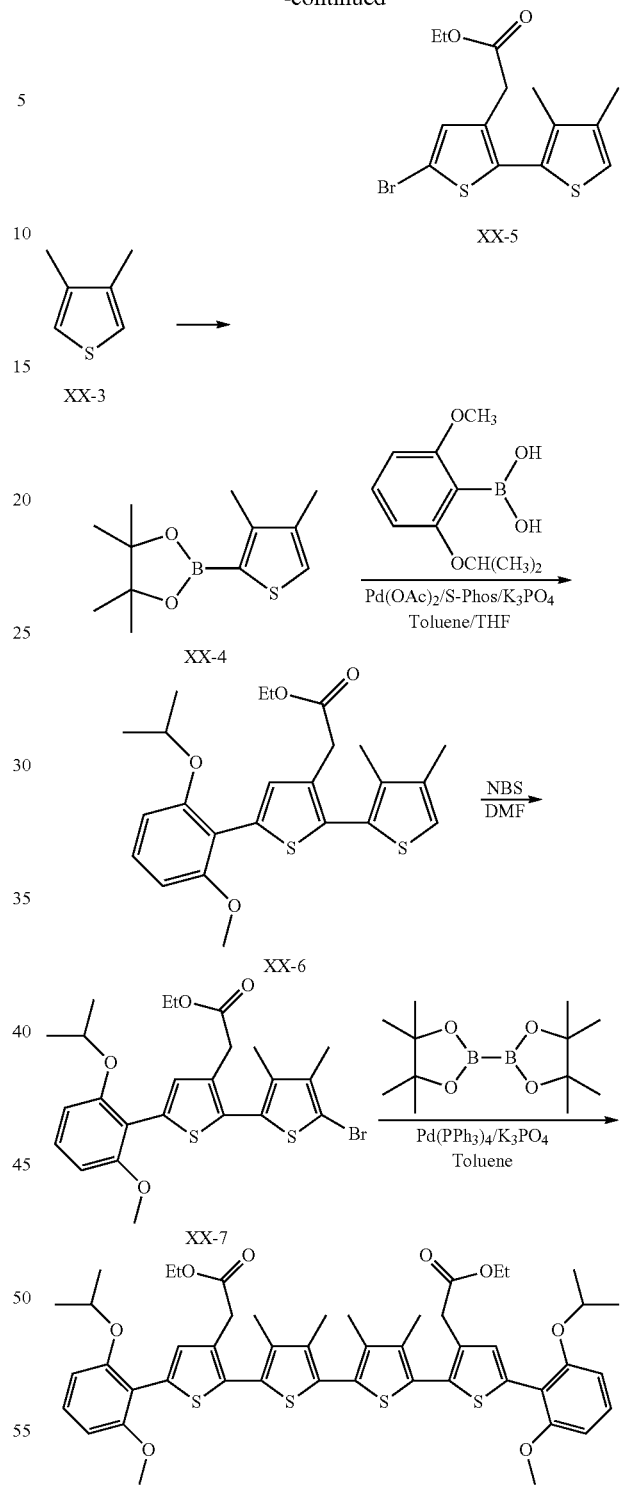

(1) The following reagent and solvent were loaded into a 300-mL reaction vessel.
XX-1 (thiophene-3-acetic acid ethyl ester): 7.6 g (44.6 mmol)
N,N-Dimethylformamide (DMF): 80 ml
Next, 31.7 g (178 mmol) of N-bromosuccinimide was added, and then the reaction solution was stirred at room temperature for 1 hour. After that, water was added to the reaction solution, and the organic layer was extracted with diethyl ether/hexane (1/1), washed with water, and then concentrated under reduced pressure to provide Intermediate Compound XX-2.

(2) The following reagent and solvent were loaded into a 100-mL reaction vessel.

XX-3 (3,4-dimethylthiophene): 2.55 g (22.7 mmol) Diethyl ether: 30 ml

Next, the reaction solution was cooled to −78° C. After that, 18.2 ml of n-butyllithium (1.62 M hexane solution) was added dropwise into the reaction solution, and then the mixture was stirred at −78° C. for 1 hour. Next, 5.92 g (31.8 mmol) of 2-isopropoxy-4,4,5,5-tetramethyl-1,3,2-dioxaborolane was added, and the mixture was further stirred for 30 minutes. After that, the reaction solution was returned to room temperature, and continuously stirred at room temperature for 2 hours. Next, an aqueous solution of ammonium chloride was added to terminate the reaction, and then the organic layer was extracted with diisopropyl ether and washed with water. After that, the ether layer was concentrated under reduced pressure to provide a crude product. Next, the crude product was separated and purified by silica gel chromatography (developing solvent:heptane/toluene=1/1) to provide Intermediate Compound XX-4.

(3) The following reagents and solvents were loaded into a 100-mL reaction vessel.

XX-2: 3.0 g (11.1 mmol)

XX-4: 3.0 g (7.56 mmol)

Toluene: 30 ml

Ethanol: 15 ml

Distilled water: 30 ml

Next, nitrogen bubbling was performed to remove dissolved oxygen in the reaction solution. Then, Pd(PPh$_3$)$_4$ (0.38 g, 0.333 mmol) and sodium carbonate (3.5 g, 33.3 mmol) were added to the reaction solution under a nitrogen atmosphere. After that, the reaction solution was stirred at 70° C. for 14 hours and then at 90° C. for 10 hours while being heated. Next, the reaction solution was cooled to room temperature, and then concentrated under reduced pressure to provide a crude product. Next, the crude product was separated and purified by silica gel chromatography (developing solvent:heptane) to provide Intermediate Compound XX-5.

(4) The following reagents and solvents were loaded into a 50-mL reaction vessel.

XX-5: 1.34 g (3.72 mmol)

2-Isopropoxy-6-methoxyphenylboronic acid: 1.02 g (4.83 mmol)

Toluene: 15 ml

Tetrahydrofuran: 5 ml

Next, nitrogen bubbling was performed to remove dissolved oxygen in the reaction solution. Then, Pd(OAc)$_2$ (28.1 mg, 0.112 mmol) and 2-dicyclohexylphosphino-2',6'-dimethoxybiphenyl (S-Phos, 153 mg, 0.372 mmol) were added to the reaction solution under a nitrogen atmosphere. Next, the reaction solution was stirred for 24 hours while being heated to reflux at 110° C. After that, the reaction solution was cooled to room temperature, and then concentrated under reduced pressure to provide a crude product. Next, the crude product was separated and purified by silica gel chromatography (developing solvent:heptane/ethyl acetate=10/1) to provide Intermediate Compound XX-6.

(5) The following reagent and solvent were loaded into a 100-mL reaction vessel.

XX-6: 1.45 g (3.26 mmol)

DMF: 15 ml

Next, 0.638 g (3.59 mmol) of N-bromosuccinimide was added, and then the reaction solution was stirred at room temperature for 2 hours. Next, water was added to the reaction solution, and the organic layer was extracted using ethyl acetate, washed with water, and then concentrated under reduced pressure to provide a crude product. Then, the crude product was separated and purified by silica gel chromatography (developing solvent:heptane/ethyl acetate=10/1) to provide Intermediate Compound XX-7.

(6) The following reagents and solvent were loaded into a 50-mL reaction vessel.

XX-7: 1.13 g (2.15 mmol)

Bis(pinacolato)diboron: 0.33 g (1.29 mmol)

Toluene: 20 ml

Next, nitrogen bubbling was performed to remove dissolved oxygen in the reaction solution. Then, Pd(PPh$_3$)$_4$ (0.24 g, 0.215 mmol) and tripotassium phosphate (0.912 g, 4.30 mmol) were added to the reaction solution under a nitrogen atmosphere. Next, the reaction solution was stirred for 18 hours while being heated to reflux at 100° C. After that, the reaction solution was cooled to room temperature, and then concentrated under reduced pressure to provide a crude product. Next, the crude product was separated and purified by silica gel chromatography (developing solvent: heptane/ethyl acetate=5/1) to provide Compound 1 as a pale yellow-brown solid.

Measurement was performed by mass spectrometry (MS) and nuclear magnetic resonance (NMR) spectroscopy to confirm the structure of Compound 1. As a result, its molecular weight and ratio of NMR peak integration values were found to agree well with the structure.

[Synthesis Example 2] Synthesis of Compound 2

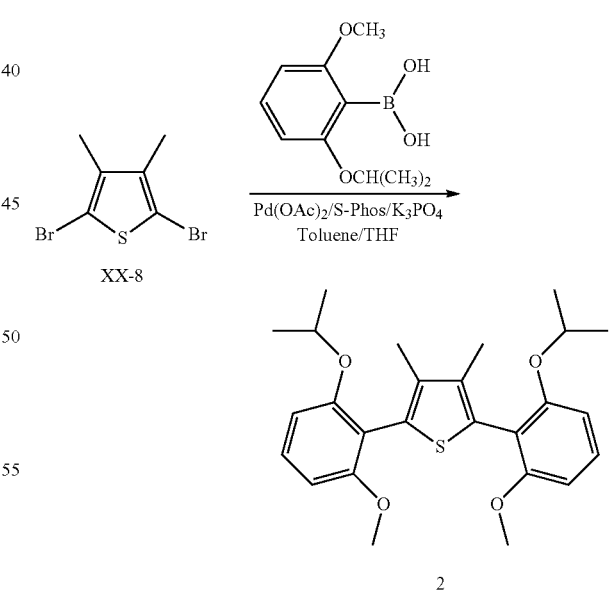

(1) The following reagent and solvent were loaded into a 300-mL reaction vessel.

XX-3 (3,4-dimethylthiophene): 5.0 g (44.6 mmol)

N,N-Dimethylformamide (DMF): 80 ml

Next, 31.7 g (178 mmol) of N-bromosuccinimide was added, and then the reaction solution was stirred at room temperature for 1 hour. After that, water was added to the reaction solution, and the organic layer was extracted with diethyl ether/hexane (1/1), washed with water, and then concentrated under reduced pressure to provide Intermediate Compound XX-8.

(2) The following reagents and solvents were loaded into a 50-mL reaction vessel.
XX-8: 500 mg (1.85 mmol)
2-Isopropoxy-6-methoxyphenylboronic acid: 1.17 g (5.56 mmol)
Toluene: 5 ml
Tetrahydrofuran: 5 ml Next, nitrogen bubbling was performed to remove dissolved oxygen in the reaction solution. Then, $Pd(OAc)_2$ (16.6 mg, 0.074 mmol), 2-dicyclohexylphosphino-2',6'-dimethoxybiphenyl (S-Phos, 76 mg, 0.185 mmol), and tripotassium phosphate (2.13 g, 9.26 mmol) were added under a nitrogen atmosphere. Next, the reaction solution was stirred for 6 hours while being heated to reflux at 100° C. After that, the reaction solution was cooled to room temperature, and then concentrated under reduced pressure to provide a crude product. Next, the crude product was separated and purified by silica gel chromatography (developing solvent:hexane/ethyl acetate=5/2) to provide Compound 2 as a colorless viscous liquid.

As in the case of Compound 1, measurement was performed by mass spectrometry (MS) and nuclear magnetic resonance (NMR) spectroscopy to confirm the structure of Compound 2. As a result, its molecular weight and ratio of NMR peak integration values agreed well with the structure.

[Measurement and Evaluation of Anodic EC Material]

Through electrochemical measurement, the reversibility of each of Compound 1 serving as a first EC material which was anodic and Compound 2 serving as a second EC material which was also anodic was measured and evaluated.

First, the following materials and solvent were mixed to prepare solutions.

(1-1) Solution A1 for Measurement

A solution of 0.1 M tetrabutylammonium hexafluorophosphate in propylene carbonate (PC), and Compound 1 (first EC material) were mixed to prepare a solution having a concentration of 1 mM.

(1-2) Solution B1 for Measurement

A solution of 0.1 M tetrabutylammonium hexafluorophosphate in propylene carbonate (PC), and Compound 2 (second EC material) were mixed to prepare a solution having a concentration of 1 mM.

Next, each solution for measurement was subjected to nitrogen gas bubbling to remove dissolved oxygen. Then, the previously prepared solution for measurement was introduced into a measurement cell including FTO (working electrode), a platinum electrode (counter electrode), and a silver electrode (Ag/Ag$^+$ (PF$_6$, PC), reference electrode). Next, the temperature of the solution was set to 25° C., and a 100-cycle cyclic voltammogram was measured at a scanning rate of 100 mVs$^{-1}$.

In the measurement for the solution A1 for measurement, Compound 1 was observed to exhibit a redox wave corresponding to a reversibly coloring oxidation reaction, which appeared at a half-wave potential of 0.14 V, and a current corresponding to a low-reversibility oxidation reaction, which rose from 0.68 V. Meanwhile, in the measurement for the solution B1 for measurement, Compound 2 exhibited a redox wave corresponding to a reversibly coloring oxidation reaction at a half-wave potential of 0.36 V. In addition, in the cyclic voltammogram of Compound 2, a current value resulting from the oxidation of Compound 2 at +0.14 V was $4.3 \times 10^{-6}$ A. It should be noted that this value was small, being 5.6% of a current value ($7.7 \times 10^{-5}$ A) resulting from the oxidation reaction in which Compound 1 was reversibly colored at the same potential. As the scanning range of the solution A1 for measurement, the range of from −0.3 V to 0.6 V was selected in the case of causing Compound 1 to undergo only the reversibly coloring oxidation reaction, and the range of from −0.3 V to 1.0 V was selected in the case of causing Compound 1 to undergo the low-reversibility oxidation reaction. Meanwhile, the range of from −0.3 V to 0.7 V was selected as the scanning range of the solution B1 for measurement.

The peak value of current of the reversibly coloring oxidation reaction in the 100th cycle in the cyclic voltammogram of this experimental example when the peak value of current of the same reaction in the 10th cycle is defined as 1 is shown in Table 3 below. In addition, for Compound 2, the oxidation peak value of current of the redox wave at a half-wave potential of −0.37 V in the 100th cycle when the peak value of current in the 10th cycle is defined as 1 is shown in Table 3 below.

TABLE 5

|  | 100th cycle |
|---|---|
| Compound 1 (reversibly coloring oxidation reaction) | 0.995 |
| Compound 1 (reversibly coloring oxidation reaction + low-reversibility oxidation reaction) | 0.0 |
| Compound 2 | 0.97 |

From Table 5, it was found that the amount of active Compound 1 was significantly decreased by causing Compound 1 to undergo the second oxidation (irreversible oxidation) as compared to the case of causing Compound 1 to undergo only the first oxidation (reversible oxidation). In addition, in contrast, it was found that the decrease amount of the peak current when the number of measurement cycles was increased in the oxidation-reduction of Compound 2 was small as compared to Compound 1 having undergone the second oxidation.

[Simulation Regarding Anodic EC Material]

Next, the simulation results of the profile of the organic EC device using an anodic EC material are described below. Parameters used in this simulation are shown in Table 4 below.

TABLE 6

|  | $P_1$ | $P_2$ |
|---|---|---|
| Compound 1 | 0.000056 | 0.82 |

In Table 6, the $P_1$ value is a decrease ratio per cycle calculated from the decrease amount of active Compound 1 during the period from the 10th cycle to the 100th cycle shown in Table 3 (the $P_2$ value refers to a decrease amount per cycle because the decrease amount per cycle is high). Those values ($P_1$, $P_2$) may differ from actual values in terms of absolute values from the viewpoint of the effect of the present invention (improvement of the cycle durability of the organic EC device), but are considered to exhibit a correct tendency.

Figure 7:
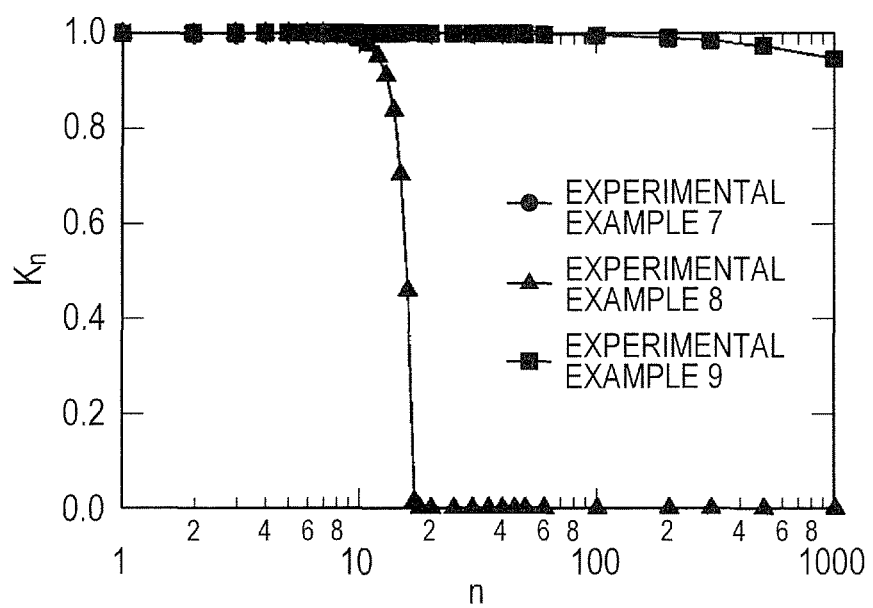
FIG. 7 is a graph for showing a relationship between the number of redox cycles and the amount of an active EC material.

Using those values, cycle characteristics in the case where the amount of Compound 2 (second EC material) is set to be equal to that of Compound 1 and the case where no second EC material is used are shown in FIG. 7. FIG. 7 is a graph for showing a relationship between the number of redox cycles and the amount of the active EC material in each of Experimental Examples 7 to 9. Here, Experimental Example 7 is an experimental example using Compound 2 (second EC material) in addition to Compound 1 (first EC material). In addition, Experimental Example 8 is an experimental example in the case of using only Compound 1 (first EC material). It should be noted that in FIG. 7, the plot for Experimental Example 7 (●) is not visible, but in fact, is overlapped by the plot for Experimental Example 9 to be described later (■).

The following matter was found from the graph of FIG. 7. That is, it was found that when a second EC material having the following features was incorporated together with the first EC material, the cycle characteristic of the organic EC device was improved.

The oxidation potential of the redox substance is present between the first oxidation potential (reversible oxidation) and the second oxidation potential (irreversible oxidation) of the organic EC material. That is, the following relationship is satisfied: first oxidation potential<oxidation potential of redox substance<second oxidation potential.

The redox substance is oxidized after the first oxidation of the organic EC material, and hence the redox substance does not inhibit the first oxidation of the organic EC material. On the other hand, the second oxidation of the organic EC material occurs after the oxidation of the redox substance, and hence the second oxidation of the organic EC material is inhibited by the redox substance.

In addition, based on the cyclic voltammogram measurement of the first EC material, it was able to be confirmed that when a second EC material having a half-wave potential of the reversible oxidation reaction between the half-wave potential of the first oxidation reaction and the half-wave potential of the second oxidation reaction was used, the cycle characteristic of the organic EC device was improved.

Figure 8:
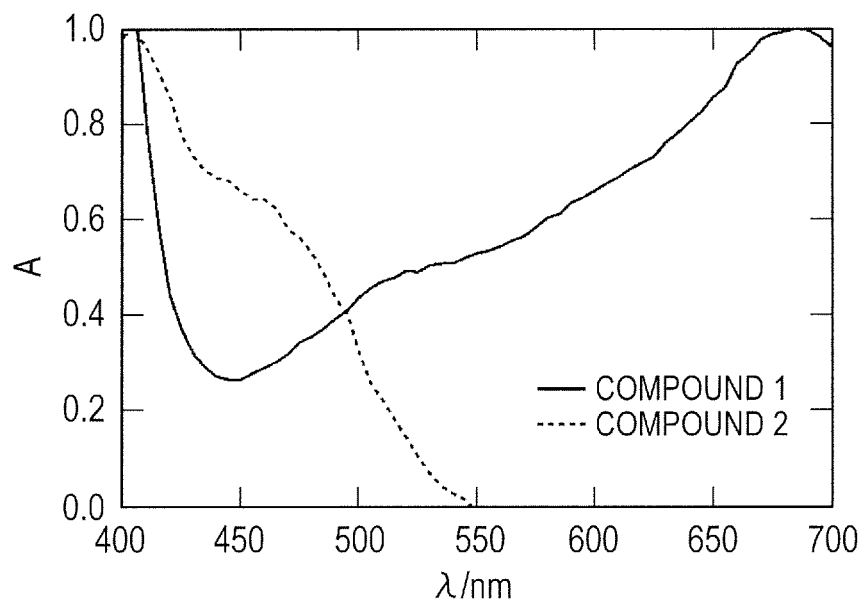
FIG. 8 is a graph for showing an absorption spectra of Compounds 1 and 2 of an example of an organic EC device according to the present invention.

FIG. 8 is a graph for showing the absorption spectra of the monooxidized radical forms of Compounds 1 and 2. It should be noted that the spectra shown in FIG. 8 are absorption spectra normalized in the wavelength region of visible light (400 nm to 700 nm), in which the organic EC device is intended to be used. In this case, the absorption peak wavelengths of the monooxidized radical forms of Compounds 1 and 2 are as shown in Table 7 below.

TABLE 7

| EC material | Peak wavelength [nm] |
| --- | --- |
| Compound 1 (first EC material) | 679 |
| Compound 2 (second EC material) | 405 |

From Table 7 and FIG. 8, it can be confirmed that the absorption wavelength region of Compound 2 (second EC material) when Compound 2 is colored (is converted to the monooxidized radical form) substantially differs from the absorption wavelength region of the monooxidized radical form of Compound 1 (first EC material). In this connection, an experiment was performed for a cycle characteristic in the case of: detecting absorption at 450 nm, at which strong absorption of Compound 2 was found while absorption of Compound 1 was relatively small; and controlling an operation charge amount so as to prevent an increase in absorption at 450 nm as a ratio to absorption at 680 nm, near the peak wavelength of Compound 1 (Experimental Example 9). The experiment results of Experimental Example 9 are shown in FIG. 7. Comparing Experimental Examples 8 and 9, it was found that the system of Experimental Example 9 had a higher cycle characteristic. Thus, it was found that when the second EC material having an absorption wavelength region substantially different from the absorption wavelength of the first EC material was used together with the first EC material, the durability of the organic EC device was able to be improved.

[Measurement and Evaluation of Cathodic EC Material]

Through electrochemical measurement, the reversibility of each of ethyl viologen (hexafluorophosphate salt, EV) serving as a first EC material which was cathodic and methyl viologen (hexafluorophosphate salt, MV) serving as a second EC material which was also cathodic was measured and evaluated.

First, the following materials and solvent were mixed to prepare solutions.

(2-1) Solution A2 for Measurement

A solution of 0.1 M tetrabutylammonium hexafluorophosphate in propylene carbonate (PC), and ethyl viologen (first EC material) were mixed to prepare a solution having a concentration of 1 mM.

(2-2) Solution B2 for Measurement

A solution of 0.1 M tetrabutylammonium hexafluorophosphate in propylene carbonate (PC), and methyl viologen (second EC material) were mixed to prepare a solution having a concentration of 1 mM.

Next, each solution for measurement was subjected to nitrogen gas bubbling to remove dissolved oxygen. Then, the previously prepared solution for measurement was introduced into a measurement cell including FTO (working electrode), a platinum electrode (counter electrode), and a silver electrode (Ag/Ag$^+$ (PF$_6$, PC), reference electrode). Next, the temperature of the solution was set to 25° C., and a 100-cycle cyclic voltammogram was measured at a scanning rate of 100 mVs$^{-1}$.

In the measurement for the solution A2 for measurement, EV was observed to exhibit a redox wave corresponding to a first reduction reaction (reversible reduction reaction), which appeared at a half-wave potential of −1.24 V, and a current corresponding to a second reduction reaction (irreversible reduction reaction), which appeared at a half-wave potential of −1.65 V. Meanwhile, in the measurement for the solution B2 for measurement, MV exhibited a redox wave corresponding to a reversibly coloring reduction reaction at a half-wave potential of −1.45 V. In addition, in the cyclic voltammogram of MV, a current value resulting from the reduction of MV at −1.24 V was 1.8×10$^{-6}$ A. It should be noted that this value was small, being 2.2% of a current value (8.3×10$^{-5}$ A) resulting from the reduction reaction in which EV was reversibly colored at the same potential. As the scanning range of the solution A2 for measurement, the range of from 0.0 V to −1.4 V was selected in the case of causing EV to undergo only the reversibly coloring reduction reaction, and the range of from 0.0 V to −2.0 V was selected in the case of causing EV to undergo the low-reversibility reduction reaction. Meanwhile, the range of from 0.0 V to −1.6 V was selected as the scanning range of the solution B2 for measurement.

The peak value of current of the reversibly coloring reduction reaction in the 100th cycle in the cyclic voltammogram of this experimental example when the peak value of current of the same reaction in the 10th cycle is defined as 1 is shown in Table 8 below. In addition, for MV, the reduction peak value of current of the redox wave at a half-wave potential of −1.45 V in the 100th cycle when the peak value of current in the 10th cycle is defined as 1 is shown in Table 8 below.

TABLE 8

|  | 100th cycle |
| --- | --- |
| EV (first reduction reaction) | 0.999 |
| EV (first reduction reaction, second reduction reaction) | 0.97 |
| MV | 0.997 |

From Table 8, it was found that the amount of active EV was decreased by causing EV to undergo the second reduction (irreversible reduction reaction) as compared to the case of causing EV to undergo only the first reduction (reversible reduction reaction). In addition, in contrast, it was found that the decrease amount of the peak current when the number of measurement cycles was increased in the oxidation-reduction of MV was small as compared to EV having undergone the second reduction.

[Simulation regarding Cathodic EC Material]

Next, the simulation results of the profile of the organic EC device using a cathodic EC material are described below. Parameters used in this simulation are shown in Table 9 below.

TABLE 9

|  | $P_1$ | $P_2$ |
| --- | --- | --- |
| EV | 0.000011 | 0.00034 |

In Table 9, the $P_1$ value and the $P_2$ value are each a decrease ratio per cycle calculated from the decrease amount of active EV during the period from the 10th cycle to the 100th cycle shown in Table 6. Those values ($P_1$, $P_2$) may differ from actual values in terms of absolute values from the viewpoint of the effect of the present invention (improvement of the cycle durability of the organic EC device), but are considered to exhibit a correct tendency.

Figure 9:
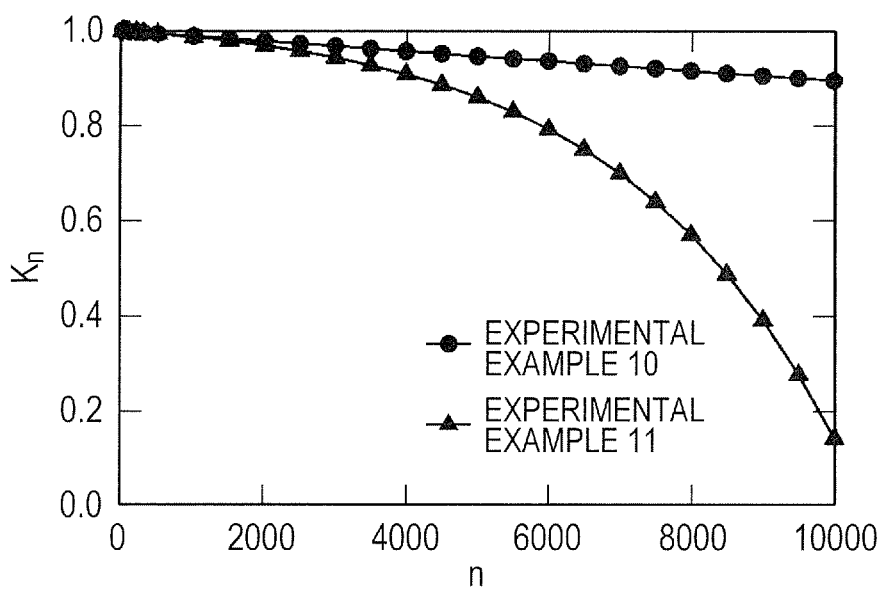
FIG. 9 is a graph for showing a relationship between the number of redox cycles and the amount of an active EC material.

Using those values, cycle characteristics in the case where the amount of MV (second EC material) is set to be equal to that of EV and the case where no second EC material is used are shown in FIG. 8. FIG. 9 is a graph for showing a relationship between the number of redox cycles and the amount of the active EC material in each of Experimental Examples 10 and 11. Here, Experimental Example 10 is an experimental example using MV (second EC material) in addition to EV (first EC material). In addition, Experimental Example 11 is an experimental example in the case of using only EV (first EC material).

From FIG. 9, it was able to be confirmed from the viewpoint of a redox potential that when a second EC material (MV) having the following features was used, the cycle characteristic of the organic EC device was improved.

Its oxidation reaction hardly occurs at the potential at which first reduction reaction (reversible reduction reaction) of the first EC material occurs.

Its reduction reaction occurs at a potential higher than the potential at which the second reduction reaction (irreversible reduction reaction) of the first EC material occurs.

The reversibility of its reduction reaction is high as compared to the second reduction reaction of the first EC material.

In addition, based on the cyclic voltammogram measurement of the first EC material (EV), it was able to be confirmed that when a second EC material having a half-wave potential of the reversible reduction reaction between the half-wave potential of the first reduction reaction and the half-wave potential of the second reduction reaction was used, the cycle characteristic of the organic EC device was improved.

Incidentally, the absorption peak wavelengths of the monooxidized radical forms of EV and MV are as shown in Table 10 below.

TABLE 10

| EC material | Peak wavelength [nm] |
| --- | --- |
| EV (first EC material) | 603 |
| MV (second EC reaction) | 605 |

From Table 10, it can be confirmed that the absorption wavelength region of MV (second EC material) when MV is colored (is converted to the monooxidized radical form) substantially the same as the absorption wavelength region of the monooxidized radical form of EV (first EC material). As described above, when MV having substantially the same absorption wavelength as that of EV was used, even under a situation in which the amount of EV having activity for the first reduction reaction was decreased by about 10% through 104 cycles, both the intensity and wavelength dependence of the absorption spectrum of the organic EC device hardly changed. Thus, it was found that when the second EC material having an absorption wavelength region substantially the same as the absorption wavelength of the first EC material was used together with the first EC material, the durability of the organic EC device was able to be improved.

[Example 2] Production of Organic Electrochromic Device

The organic EC device 1 illustrated in FIG. 1 was produced by a method described below.

Two substrates with a transparent electrode in each of which a fluorine-doped tin oxide (FTO) thin film having a thickness of 200 nm was formed on a glass substrate having a thickness of 1.1 mm were prepared. In this case, the FTO transparent electrode had a visible light average transmittance of 85% and a sheet resistance of 40Ω/□.

Next, a tin oxide nanoparticle slurry having an average particle diameter of 21 nm and a zinc oxide nanoparticle slurry having an average particle diameter of 34 nm were mixed so that the volume ratio between tin oxide and zinc oxide was 2:1, to thereby prepare a mixed slurry. Then, for one of the previously prepared substrates with a transparent electrode, the mixed slurry was applied onto the FTO transparent electrode of the substrate, to thereby form a coating film. Next, the coating film was baked at 500° C. for 30 minutes, and then only zinc oxide was etched with dilute hydrochloric acid to provide a porous tin oxide nanoparticle film. In this case, the porous tin oxide nanoparticle film had a thickness of about 5.0 μm. It should be noted that in the following description, the substrate with a transparent electrode whose outermost surface is the FTO transparent electrode (first electrode 11a) is referred to as "first substrate 10a", and the substrate with a transparent electrode whose outermost surface is the porous tin oxide nanoparticle film (second electrode 11b) is referred to as "second substrate 10b".

Next, the first substrate 10a and the second substrate 10b were arranged so that their conductive surfaces (surfaces having arranged thereon the electrodes) were opposed to each other and the substrates had a constant distance therebetween. Then, the two substrates (10a, 10b) were bonded using an epoxy resin in such a manner that an opening for the injection of the solution for filling the EC layer 12 was left. Thus, a cell for an organic EC device was produced. At this time, the interelectrode distance was adjusted by forming the sealing material 13 through the use of films or beads having different thicknesses as spacers. It should be noted that in the device to be produced, the FTO transparent electrode (first electrode 11a) functions as a working electrode.

Next, a first EC material (Compound 1), a second EC material (Compound 2), and a supporting electrolyte (mixed solution of 0.1 M tetrabutylammonium hexafluorophosphate and propylene carbonate) were mixed to prepare an EC composition.

Next, the previously prepared cell for an organic EC device was filled with the EC composition through the opening of the cell by a vacuum injection method to form the EC layer 12. Further, the opening of the cell was sealed with an epoxy resin. Thus, the organic EC device 1 was produced.

Example 3

The organic EC device 1 was produced by the same method as that of Example 1 except that in Example 2, EV was used as the first EC material in place of Compound 1 and MV was used as the second EC material in place of Compound 2.

According to the present invention, the organic electrochromic device which has a high response speed and is excellent in durability even when a large current is flowed transiently can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-225714, filed Nov. 6, 2014, and Japanese Patent Application No. 2014-225715, filed Nov. 6, 2014 which are hereby incorporated by reference herein in their entirety.

The invention claimed is:

1. An organic electrochromic device, comprising:
a pair of electrodes; and
an electrochromic layer arranged between the pair of electrodes,
wherein:
the electrochromic layer contains an organic electrochromic material, a redox substance, and a solvent;
the organic electrochromic material and the redox substance each comprise a material to be reversibly subjected to a redox reaction;
a peak change amount of a molar absorption coefficient caused by the redox reaction of the redox substance is ¼ or less than that of the organic electrochromic material; and
a potential at which the redox substance is oxidized is present between a potential at which the organic electrochromic material is reversibly oxidized and a potential at which the organic electrochromic material is irreversibly oxidized, or a potential at which the redox substance is reduced is present between a potential at which the organic electrochromic material is reversibly reduced and a potential at which the organic electrochromic material is irreversibly reduced.

2. The organic electrochromic device according to claim 1, wherein a voltage at which the organic electrochromic device is driven is applied within a range between the potential at which the redox substance is oxidized and the potential at which the redox substance is reduced.

3. The organic electrochromic device according to claim 1, wherein a half-wave potential of an oxidation reaction of the redox substance is present between a half-wave potential in a reversible oxidation reaction of the organic electrochromic material and a half-wave potential in an irreversible oxidation reaction of the organic electrochromic device in a cyclic voltammogram of the organic electrochromic material.

4. The organic electrochromic device according to claim 1, wherein a half-wave potential of a reduction reaction of the redox substance is present between a half-wave potential in a reversible reduction reaction of the organic electrochromic material and a half-wave potential in an irreversible reduction reaction of the organic electrochromic device in a cyclic voltammogram of the organic electrochromic material.

5. The organic electrochromic device according to claim 1, wherein the redox substance is free of electrochemical oxidization at a potential at which the organic electrochromic material starts to be reversibly oxidized.

6. The organic electrochromic device according to claim 1, wherein the redox substance is free of electrochemical reduction at a potential at which the organic electrochromic material starts to be reversibly reduced.

7. The organic electrochromic device according to claim 1, wherein a value of current resulting from a reaction of the redox substance at a half-wave potential of a reversible oxidation reaction of the organic electrochromic material is ⅕ or less of a value of current resulting from the reversible oxidation reaction of the organic electrochromic material.

8. The organic electrochromic device according to claim 1, wherein a value of current resulting from a reaction of the redox substance at a half-wave potential of a reversible reduction reaction of the organic electrochromic material is ⅕ or less of a value of current resulting from the reversible reduction reaction of the organic electrochromic material.

9. The organic electrochromic device according to claim 1, wherein the electrochromic material and the redox substance satisfy formula (A):

$$R/S \geq 0.2 \quad (A)$$

wherein, in the formula (A), R represents a molar amount per number of electrons of a reaction of the redox substance contained in the electrochromic layer, and S represents a molar amount per number of electrons of a reaction of the organic electrochromic material with reference to the redox substance.

10. The organic electrochromic device according to claim 1, wherein the redox substance is dissolved in the solvent.

11. A lens unit, comprising:
the electrochromic device of claim 1;
an active device connected to the electrochromic device; and
an optical system including a plurality of lenses.

12. An imaging apparatus, comprising:
the organic electrochromic device of claim 1;
an active device connected to the organic electrochromic device; and an imaging device configured to receive light which has passed through the organic electrochromic device.

13. A window member, comprising:
a pair of transparent substrates;
the organic electrochromic device of claim 1 disposed between the pair of transparent substrates; and
an active device connected to the organic electrochromic device.

14. The organic electrochromic device according to claim 1, wherein the redox substance is not an electrochromic material.

15. The organic electrochromic device according to claim 1, wherein an interelectrode distance of the pair of electrodes is 0.6 µm to 300 µm.

16. The organic electrochromic device according to claim 1, wherein an interelectrode distance of the pair of electrodes is 4 µm to 130 µm.

17. An organic electrochromic device, comprising:
a pair of electrodes; and
an electrochromic layer arranged between the pair of electrodes,
wherein:
the electrochromic layer contains an organic electrochromic material, a redox substance, and a solvent;
the organic electrochromic material and the redox substance each comprise a material to be reversibly subjected to a redox reaction;
a peak change amount of a molar absorption coefficient caused by the redox reaction of the redox substance is ¼ or less than that of the organic electrochromic material; and
the organic electrochromic material has a first oxidation potential and a second oxidation potential, and an oxidation potential of the redox substance is present between the first oxidation potential and the second oxidation potential, or
the organic electrochromic material has a first reduction potential and a second reduction potential, and a reduction potential of the redox substance is present between the first reduction potential and the second reduction potential.

18. The organic electrochromic device according to claim 17, wherein the redox substance is not an electrochromic material.

19. An organic electrochromic device, comprising:
a pair of electrodes; and
an electrochromic layer arranged between the pair of electrodes,
wherein:
the electrochromic layer contains an organic electrochromic material, a redox substance, and a solvent;
the organic electrochromic material and the redox substance each comprise a material to be reversibly subjected to a redox reaction; and
the organic electrochromic material has a first oxidation potential and a second oxidation potential, and an oxidation potential of the redox substance is present between the first oxidation potential and the second oxidation potential, wherein a value of current resulting from a reaction of the redox substance at a half-wave potential of a first oxidation reaction of the organic electrochromic material is ⅕ or less of a value of current resulting from the first oxidation reaction of the organic electrochromic material; or
the organic electrochromic material has a first reduction potential and a second reduction potential, and a reduction potential of the redox substance is present between the first reduction potential and the second reduction potential, wherein a value of current resulting from a reaction of the redox substance at a half-wave potential of a first reduction reaction of the organic electrochromic material is ⅕ or less of a value of current resulting from the first reduction reaction of the organic electrochromic material.

20. The electrochromic device according to claim 19, wherein the redox substance is not an electrochromic material.

21. An imaging apparatus, comprising:
the organic electrochromic device of claim 19;
an active device connected to the organic electrochromic device; and
an imaging device configured to receive light which has passed through the organic electrochromic device.

22. A window member, comprising:
a pair of transparent substrates;
the organic electrochromic device of claim 19 disposed between the pair of transparent substrates; and
an active device connected to the organic electrochromic device.

* * * * *